US012800876B2

(12) United States Patent
Huang et al.

(10) Patent No.: US 12,800,876 B2
(45) Date of Patent: Nov. 17, 2026

(54) HIGH BRIGHTNESS ZOOM PROJECTION LENS

(71) Applicant: SUN YANG OPTICS DEVELOPMENT CO., LTD., Taoyuan City (TW)

(72) Inventors: Wei Hao Huang, Taoyuan City (TW); Yu Hung Chou, Taoyuan City (TW); Sheng Che Wu, Taoyuan City (TW)

(73) Assignee: SUN YANG OPTICS DEVELOPMENT CO., LTD., Taoyuan City (TW)

( * ) Notice: Subject to any disclaimer, the term of this patent is extended or adjusted under 35 U.S.C. 154(b) by 314 days.

(21) Appl. No.: 18/597,205

(22) Filed: Mar. 6, 2024

(65) Prior Publication Data

US 2025/0284093 A1 Sep. 11, 2025

(51) Int. Cl.

*G02B 9/64* (2006.01)
*G02B 13/02* (2006.01)
*G02B 15/14* (2006.01)

(52) U.S. Cl.

CPC ............... *G02B 9/64* (2013.01); *G02B 13/02* (2013.01); *G02B 15/1465* (2019.08)

(58) Field of Classification Search

CPC .................................................. G02B 15/1465
See application file for complete search history.

(56) References Cited

U.S. PATENT DOCUMENTS

2015/0226946 A1* 8/2015 Miyazaki ........... G02B 15/1465 359/680

FOREIGN PATENT DOCUMENTS

JP 2003015037 A * 1/2003 ......... G02B 15/1465
JP 2005338702 A * 12/2005 ......... G02B 15/1465

* cited by examiner

*Primary Examiner* — Alexander P Gross
(74) *Attorney, Agent, or Firm* — BACON & THOMAS, PLLC

(57) ABSTRACT

A high brightness zoom projection lens that meets the projection requirements of high brightness and zoom at the same time, which all lenses are made of glass lenses, satisfying 2.2>Ft/Fw>1.2, Ft is the focal length at the telephoto end, Fw is the focal length at the wide-angle end, and sequentially comprising: a first lens group, having negative diopter; a second lens group, having positive diopter; a third lens group, having positive diopter; a fourth lens group, having negative diopter; a fifth lens group, having positive diopter; a sixth lens group, having positive diopter, and the Abbe number of the last lens close to the narrowing side is between 16 and 25.

14 Claims, 24 Drawing Sheets

10

10

HIGH BRIGHTNESS ZOOM PROJECTION LENS

BACKGROUND OF THE INVENTION

1. Field of the Invention

The present invention relates to a high brightness zoom projection lens, particularly to one that meets the requirements of high brightness and zoom projection and maintain the quality of projection imaging.

2. Description of the Related Art

There is a corresponding relationship between the brightness of the projector and the brightness of the environment. When using a projector in a brighter environment, a projector with higher brightness is required. Furthermore, in addition to meeting the aforementioned requirements for high brightness projection, lens groups usually required zooming depending on the installation position of the projector to adjust the projection image to an appropriate size. Therefore, making the projection lens meet the projection requirements of high brightness and zoom at the same time, and can also take into account the projection imaging quality are the goal of the present invention.

SUMMARY OF THE INVENTION

A primary objective of the present invention is to provide a high brightness zoom projection lens which meet the projection requirements of high brightness and zoom at the same time.

To achieve the objects mentioned above, the present invention comprises: a high brightness zoom projection lens, which all lenses are made of glass lenses, satisfying 2.2>Ft/Fw>1.2, Ft is the focal length at the telephoto end, Fw is the focal length at the wide-angle end, and from the magnifying side to the narrowing side of the lens sequentially comprising:

a first lens group, having negative diopter, being a fixed group when zooming, and a first lens close to the magnifying side has positive diopter; a second lens group, having positive diopter, being a movable group when zooming; a third lens group, having positive diopter, being a movable group when zooming, and the amount of movement is the largest; a fourth lens group, having negative diopter, being a movable group when zooming; a fifth lens group, having positive diopter, being a movable group when zooming; a sixth lens group, having positive diopter, being a fixed group when zooming, and the Abbe number of the last lens close to the narrowing side is between 16~25.

Moreover, the first lens group 11 having a focal length value of F1 satisfying −1.1>F1/Fw>−2.5, the second lens group 12 having a focal length value of F2 satisfying 5.6>F2/Fw>2.8, the third lens group 13 having a focal length value of F3 satisfying 4.2>F3/Fw>2.5, the fourth lens group 14 having a focal length value of F4 satisfying −1.6>F4/Fw>−3.1, the fifth lens group 15 having a focal length value of F5 satisfying 3.6>F5/Fw>2.5, the sixth lens group 16 having a focal length value of F6 satisfying 3.6>F6/Fw>2.2. An aperture is set between the third lens group and the fourth lens group, and the F value of the aperture is between 1.7 and 2.4. The high brightness zoom projection lens satisfies 8.2>CA/IMH>5.8, where CA is the effective diameter of the first lens on the magnifying side and IMH is the maximum image height on the narrowing side. The high brightness zoom projection lens satisfies 10.5>TTL/IMH>7.8, where TTL is the distance from the top point of the first lens on the magnifying side to the image source on the narrowing side, and IMH is the maximum image height on the narrowing side. All lenses of the high brightness zoom projection lens are spherical lenses. The third lens group or the fourth lens group include a doublet or an achromatic doublet.

DETAILED DESCRIPTION OF THE PREFERRED EMBODIMENT

Figure 1A:
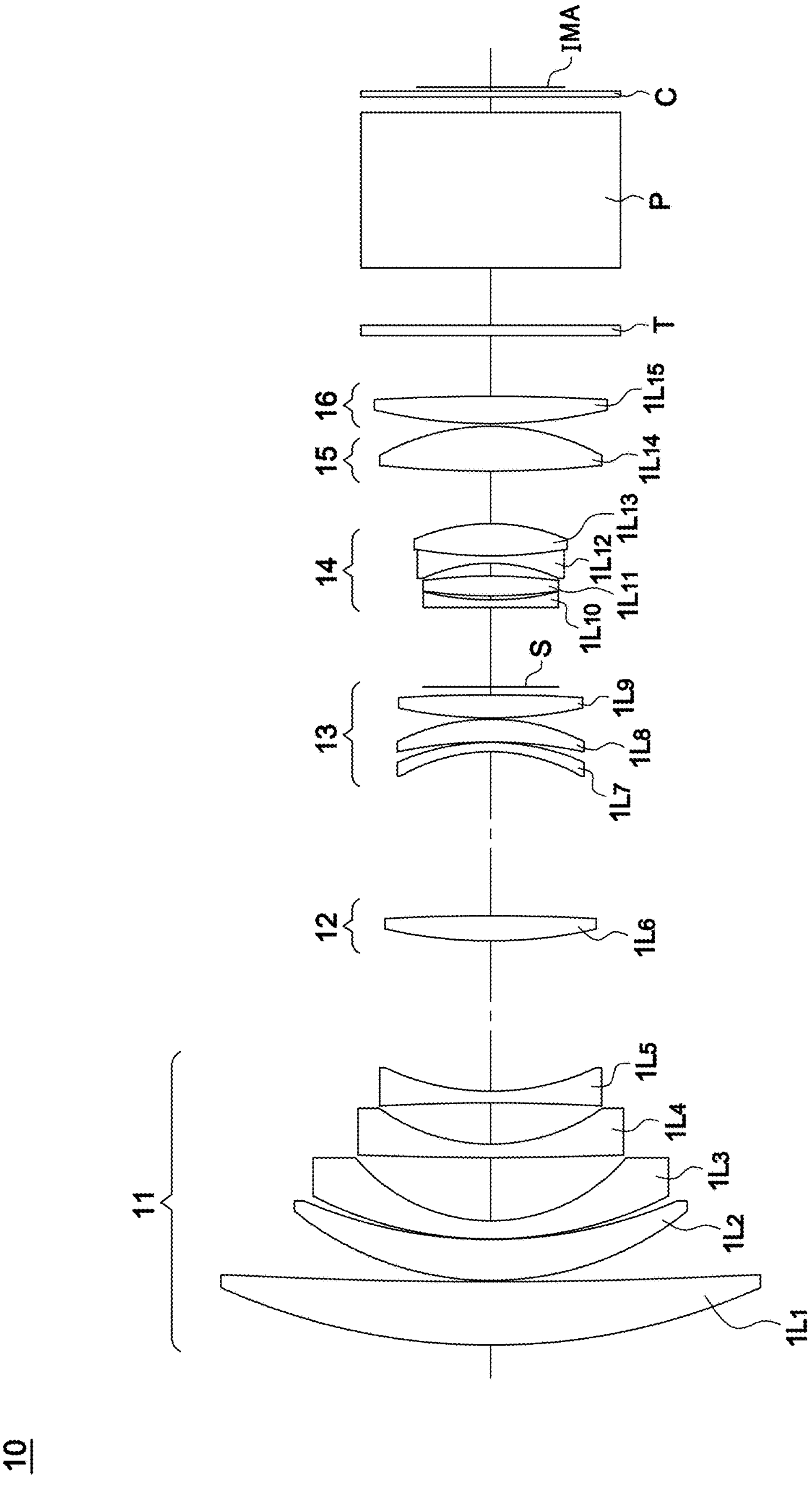
FIG. 1A is a schematic diagram illustrating lenses arrangement of the wide-angle end of the first embodiment of the present invention.
Figure 1B:
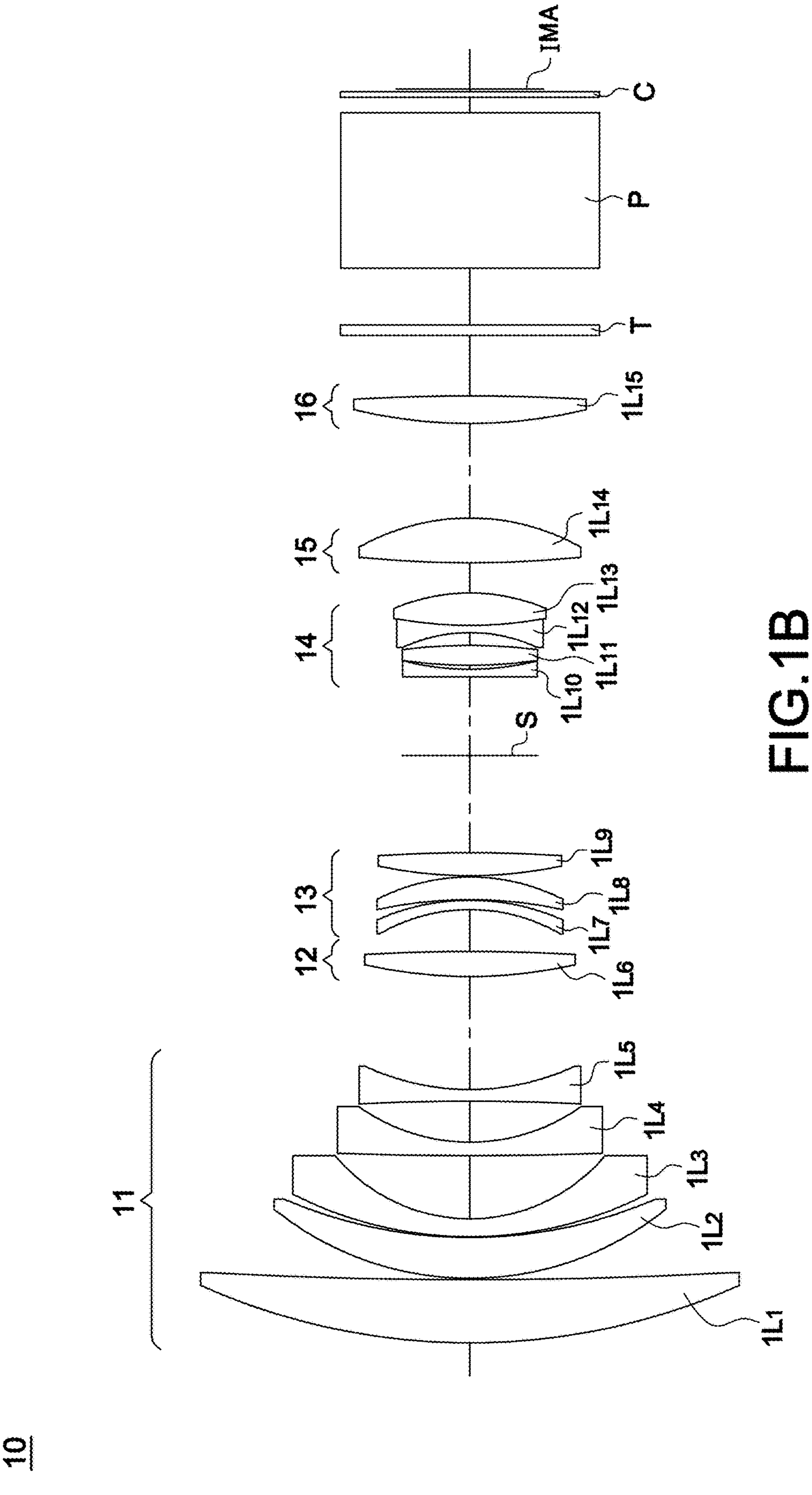
FIG. 1B is a schematic diagram illustrating lenses arrangement of the telephoto end of the first embodiment of the present invention.

Referring to FIGS. 1A and 1B, the first embodiment of the present invention includes a high brightness zoom projection lens 10, which all lenses are made of glass lenses, the focal length Ft of the telephoto end is 37.43, the focal length Fw of the wide-angle end is 24.95, Ft/Fw=1.50, and from the magnifying side to the narrowing side of the lens sequentially comprising:

- a first lens group 11, having negative diopter and a focal length value F1=−35.86, F1/Fw=−1.44, being a fixed group when zooming, the first lens group 11 has a first lens 1L1, a second lens 1L2, a third lens 1L3, a fourth lens 1L4 and a fifth lens 1L5 in sequence, and a first lens 1L1 close to the magnifying side has positive diopter and a focal length value FL=233.91;
- a second lens group 12, having positive diopter and a focal length value F2=85.08, F2/Fw=3.41, being a movable group when zooming, the second lens group 12 has a sixth lens 1L6;
- a third lens group 13, having positive diopter and a focal length value F3=80.14, F3/Fw=3.21, being a movable group when zooming, and the amount of movement is the largest, third lens group 13 has a seventh lens 1L7, an eighth lens 1L8 and a ninth lens 1L9 in sequence;
- a fourth lens group 14, having negative diopter and a focal length value (F4)=−63.41, F4/Fw=−2.54, being a movable group when zooming, and the fourth lens group 14 has a tenth lens 1L10, an eleventh lens 1L11, a twelfth lens 1L12 and a thirteenth lens 1L13 in sequence;

- a fifth lens group 15, having positive diopter and a focal length value (F5)=82.70, F5/Fw=3.31, being a movable group when zooming, and the fifth lens group 15 has a fourteenth lens 1L14;
- a sixth lens group 16, having positive diopter and a focal length value (F6)=82.39, F6/Fw=3.30, being a fixed group when zooming, and the sixth lens group 16 has a fifteenth lens 1L15, and the Abbe number of the fifteenth lens 1L15 (the last lens) close to the narrowing side is 17.94; and
- a transmissive smooth picture actuator T is arranged sequentially behind the fifteenth lens 1L15, which is a glass plate device that can rotate rapidly and minutely, it synthesizes and improves the resolution through image shifting, and sequentially arranges a prism P, a cover glass C and an image source IMA behind the transmissive smooth picture actuator T.

In addition, all lenses of the high brightness zoom projection lens 10 are spherical lenses, and an aperture S is set between the third lens group 13 and the fourth lens group 14, and the F value of the aperture S is 2.0; The effective diameter CA of the first lens 1L1 is 104.00, the distance TTL from the top point of the first lens 1L1 to the image source on the narrowing side is 242.27, and the maximum image height IMH on the narrowing side of the lens is 14.50, CA/IMH=7.17, TTL/Fw=9.71.

The lens parameters design of the high brightness zoom projection lens 10 are shown in Table 1A and Table 1B below; Wherein 1L1R1 is the magnifying side surface R1 of the first lens 1L1, and 1L1R2 is the narrowing side surface R2 of the first lens 1L1, 1L2R1 is the magnifying side surface R1 of the second lens 1L2, 1L2R2 is the narrowing side surface R2 of the second lens 1L2, . . . 1L15R1 is the magnifying side surface R1 of the fifteenth lens 1L15, 1L15R2 is the narrowing side surface R2 of the fifteenth lens 1L15, and so on; and the twelfth lens 1L12 and the thirteenth lens 1L13 can form a doublet or an achromatic doublet.

1A

| Comment | Radius(mm) | Thickness(mm) | Nd | Vd |
|---|---|---|---|---|
| 1L1R1 | 127.44 | 12.28 | 1.62 | 60.37 |
| 1L1R2 | 979.57 | 0.20 | | |
| 1L2R1 | 60.29 | 7.90 | 1.85 | 23.79 |
| 1L2R2 | 90.67 | 0.10 | | |
| 1L3R1 | 75.23 | 3.50 | 1.62 | 60.37 |
| 1L3R2 | 34.08 | 12.20 | | |
| 1L4R1 | 692.82 | 2.60 | 1.83 | 42.73 |
| 1L4R2 | 37.02 | 7.97 | | |
| 1L5R1 | −395.62 | 2.20 | 1.50 | 81.61 |
| 1L5R2 | 47.68 | A | | |
| 1L6R1 | 91.22 | 4.88 | 1.85 | 23.79 |
| 1L6R2 | −350.48 | B | | |
| 1L7R1 | −34.70 | 1.80 | 1.85 | 23.79 |
| 1L7R2 | −44.36 | 0.10 | | |
| 1L8R1 | −85.56 | 4.40 | 1.49 | 70.44 |
| 1L8R2 | −39.61 | 0.20 | | |
| 1L9R1 | 85.72 | 4.48 | 1.62 | 60.37 |
| 1L9R2 | −253.85 | C | | |
| APERTURE | INF | 15.35 | | |
| 1L10R1 | −2231.73 | 1.40 | 1.81 | 25.48 |
| 1L10R2 | 52.44 | 0.80 | | |
| 1L11R1 | 91.69 | 3.84 | 1.73 | 51.49 |
| 1L11R2 | −102.08 | 2.47 | | |
| 1L12R1 | −30.90 | 1.40 | 1.81 | 25.48 |
| 1L12R2 | 81.75 | 0.00 | | |
| 1L13R1 | 81.75 | 6.23 | 1.50 | 81.61 |
| 1L13R2 | −37.64 | D | | |
| 1L14R1 | 208.20 | 8.68 | 1.44 | 94.52 |
| 1L14R2 | −43.40 | E | | |

-continued

| 1A | | | | |
|---|---|---|---|---|
| Comment | Radius(mm) | Thickness(mm) | Nd | Vd |
| 1L15R1 | 97.25 | 5.27 | 1.95 | 17.94 |
| 1L15R2 | −408.62 | 11.71 | | |

| 1B | | |
|---|---|---|
| Zoom | Wide | Tele |
| A | 29.00 | 22.09 |
| B | 31.60 | 8.19 |
| C | 1.50 | 18.68 |
| D | 10.10 | 5.87 |
| E | 0.50 | 17.87 |

Figure 1C:
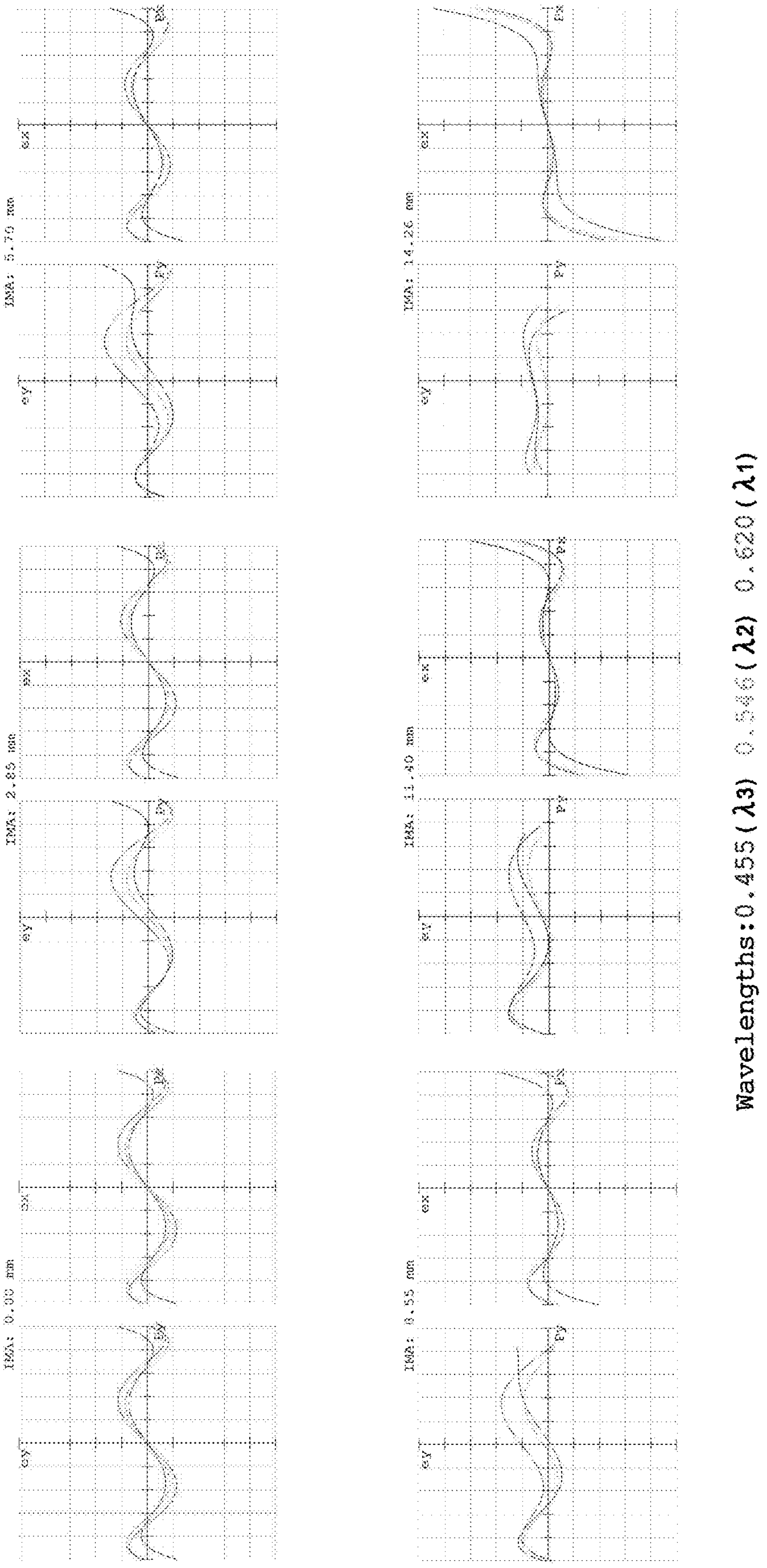
FIG. 1C is a graph illustrating the transverse ray fan plot of the wide-angle end of the first embodiment of the present invention.
Figure 1D:
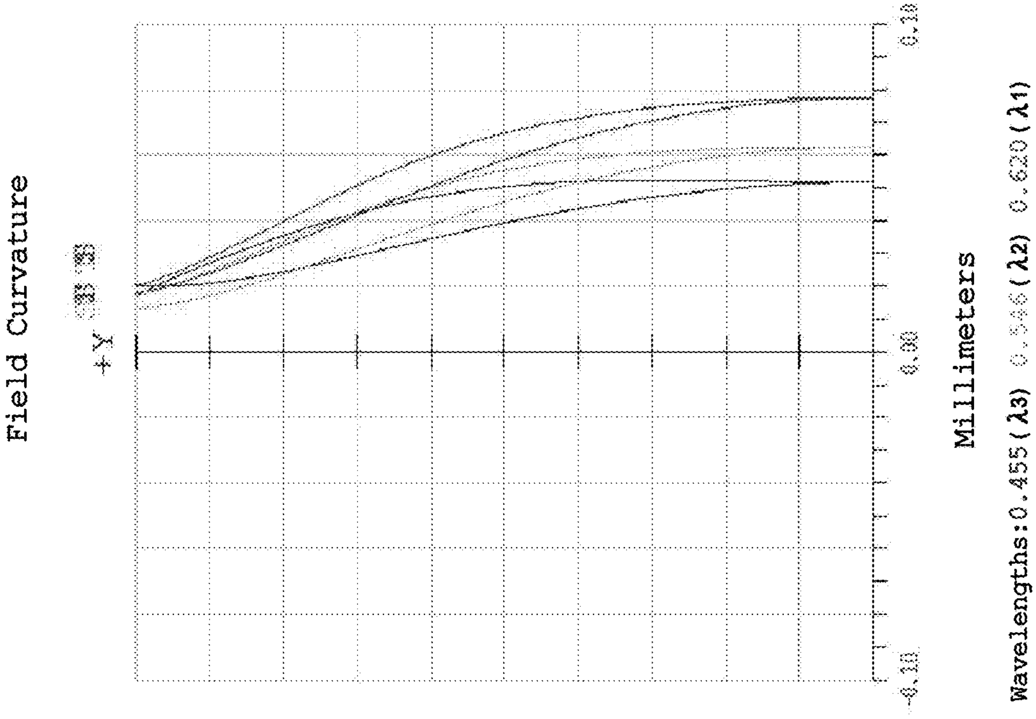
FIG. 1D is a graph illustrating the field curvature of the wide-angle end of the first embodiment of the present invention.
Figure 1E:
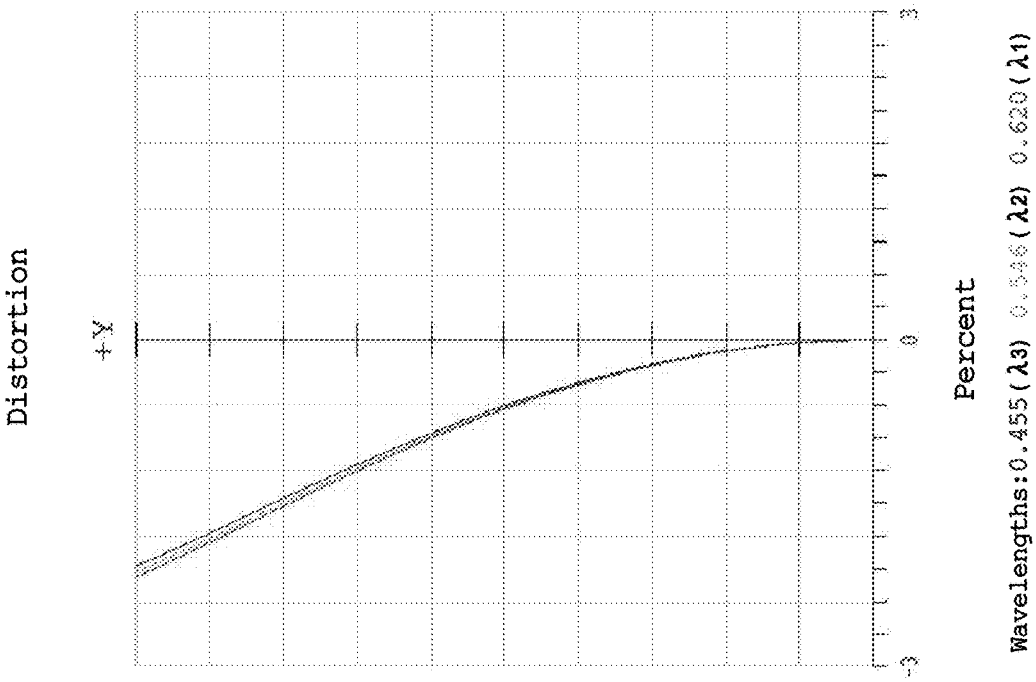
FIG. 1E is a graph illustrating the distortion of the wide-angle end of the first embodiment of the present invention.
Figure 1F:
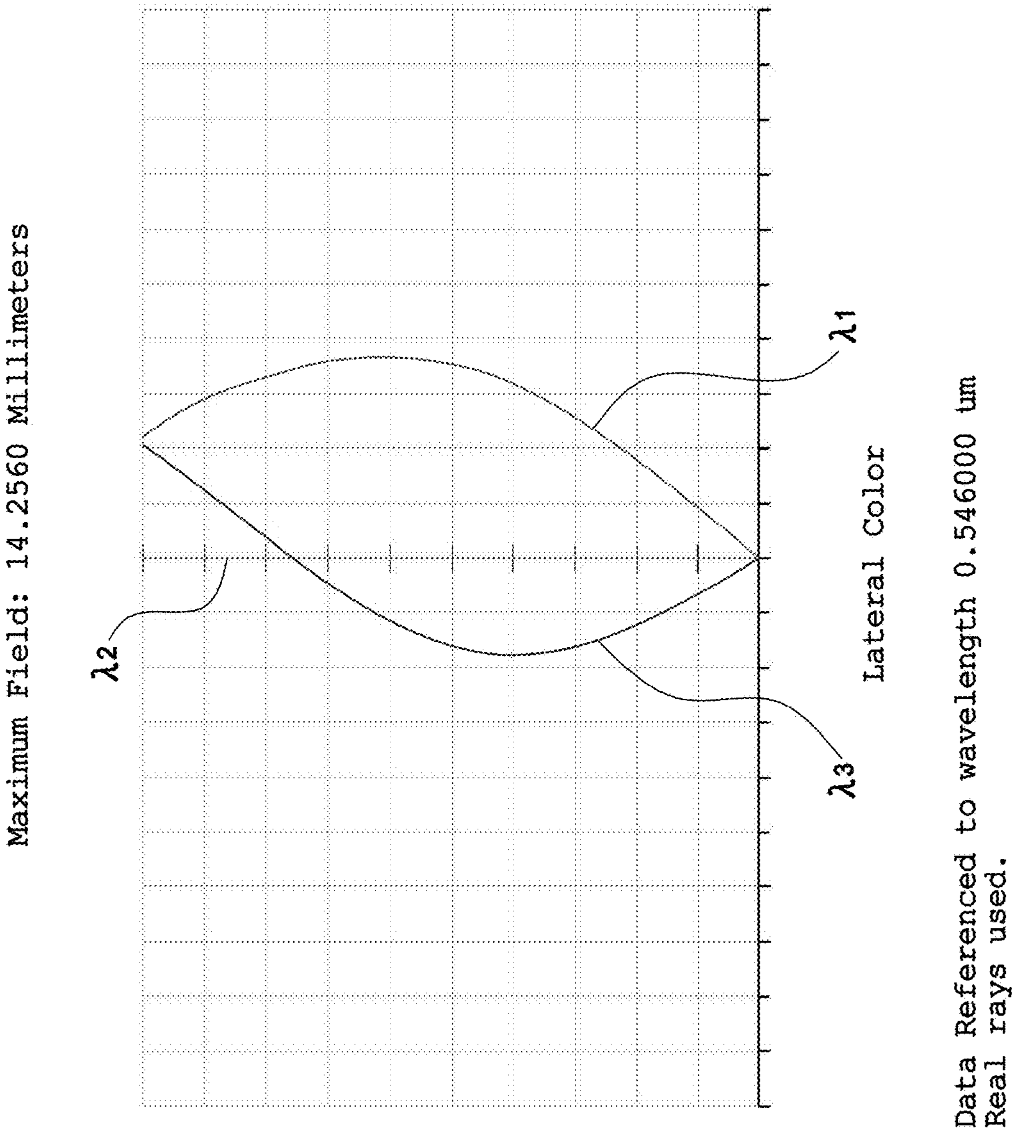
FIG. 1F is a graph illustrating the lateral color aberration of the wide-angle end of the first embodiment of the present invention.

The wide-angle end of the high brightness zoom projection lens 10 uses a first wavelength λ1 of 620 nm, a second wavelength λ2 of 546 nm and a third wavelength λ3 of 455 nm to simulate different transverse ray fan plot as shown in FIG. 1C, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −20 um~20 um; The field curvature diagram in FIG. 1D has a maximum field of view of 30.187 degrees, curves T and S are respectively the tangential field curvature characteristic curve and the sagittal field curvature characteristic curve, the tangential field curvature value and sagittal field curvature value are controlled within the range of 0.00 mm~0.08 mm; The distortion diagram in FIG. 1E has a maximum field of view of 30.187 degrees, and the distortion amount is controlled within the range of −2.4%~0; The lateral color aberration diagram in FIG. 1F has a maximum field of view of 14.256 mm, and using a wavelength of about 0.546 microns as a reference, the lateral color aberration value is controlled within the range of −1.8 um~3.6 um.

Figure 1G:
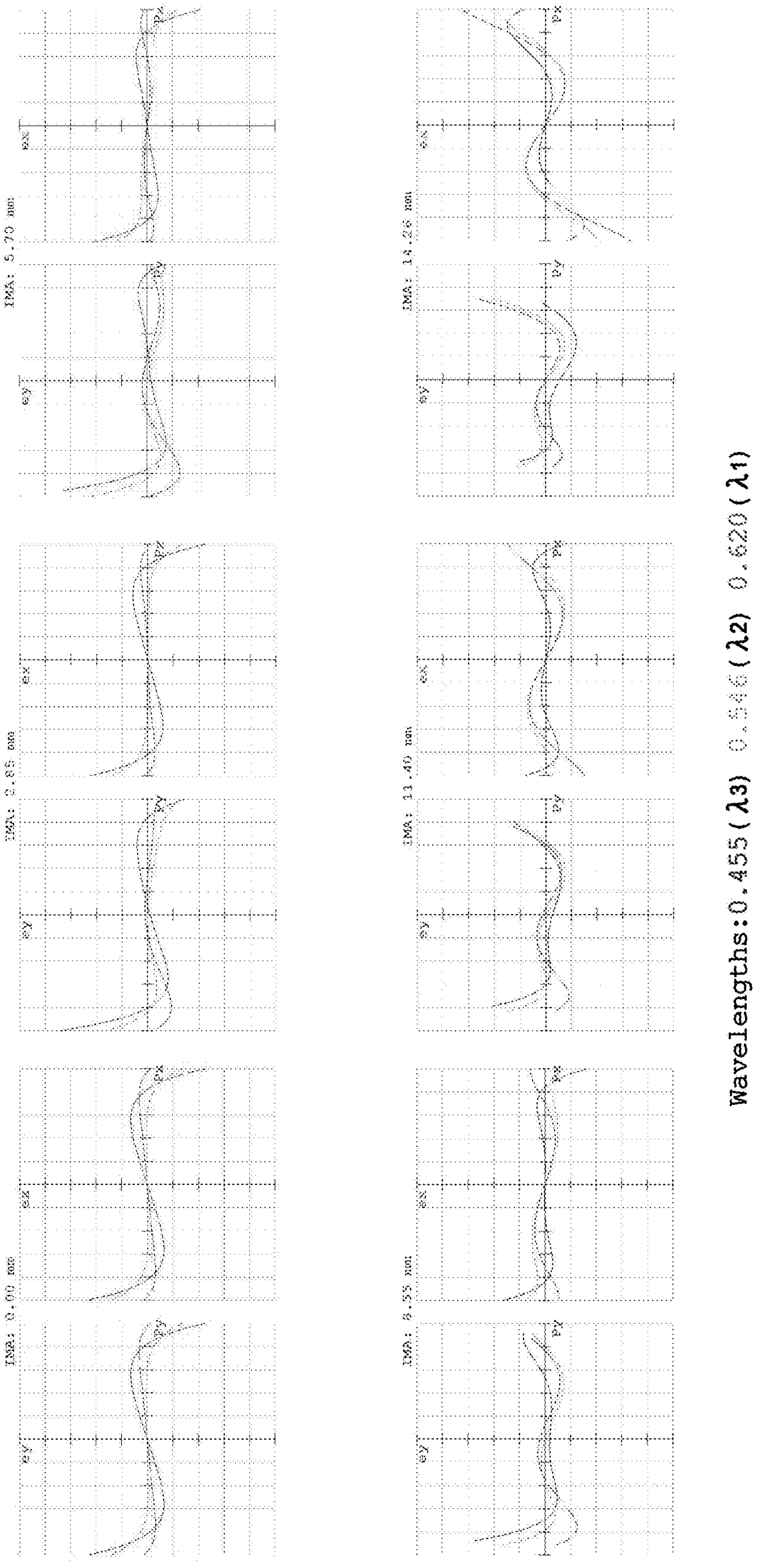
FIG. 1G is a graph illustrating the transverse ray fan plot of the telephoto end of the first embodiment of the present invention.
Figure 1H:
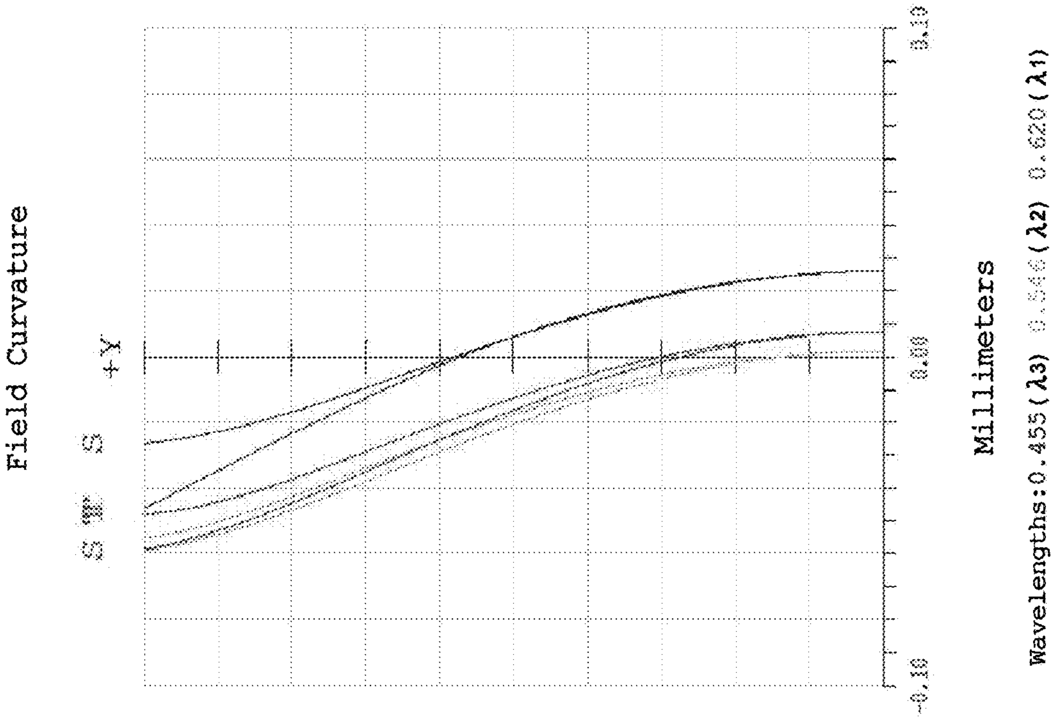
FIG. 1H is a graph illustrating the field curvature of the telephoto end of the first embodiment of the present invention.
Figure 1I:
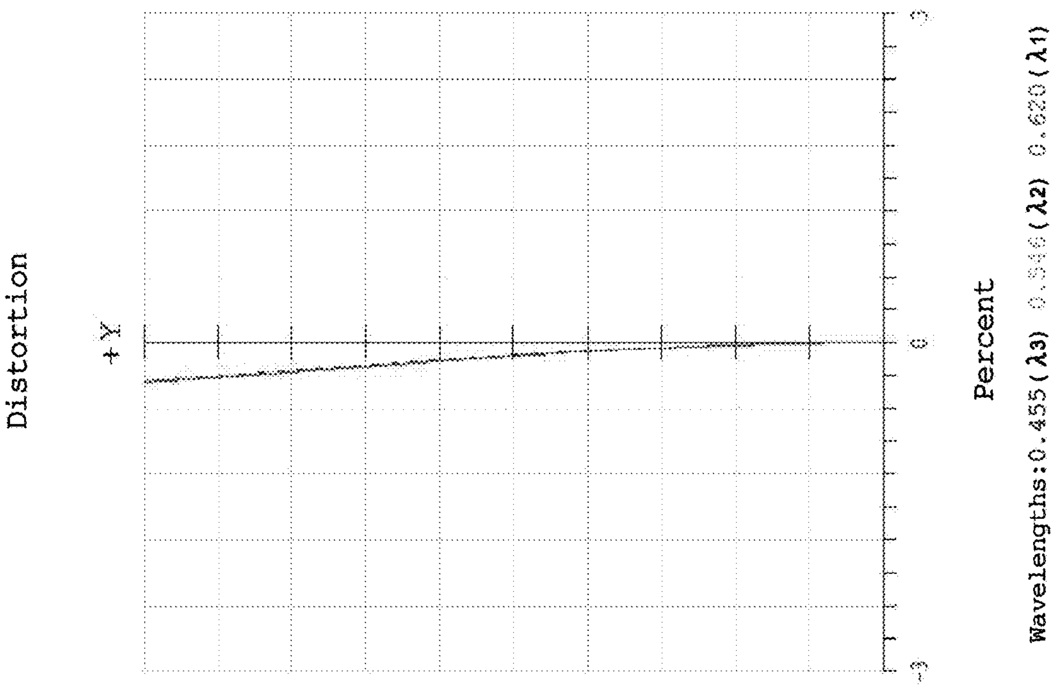
FIG. 1I is a graph illustrating the distortion of the telephoto end of the first embodiment of the present invention.
Figure 1J:
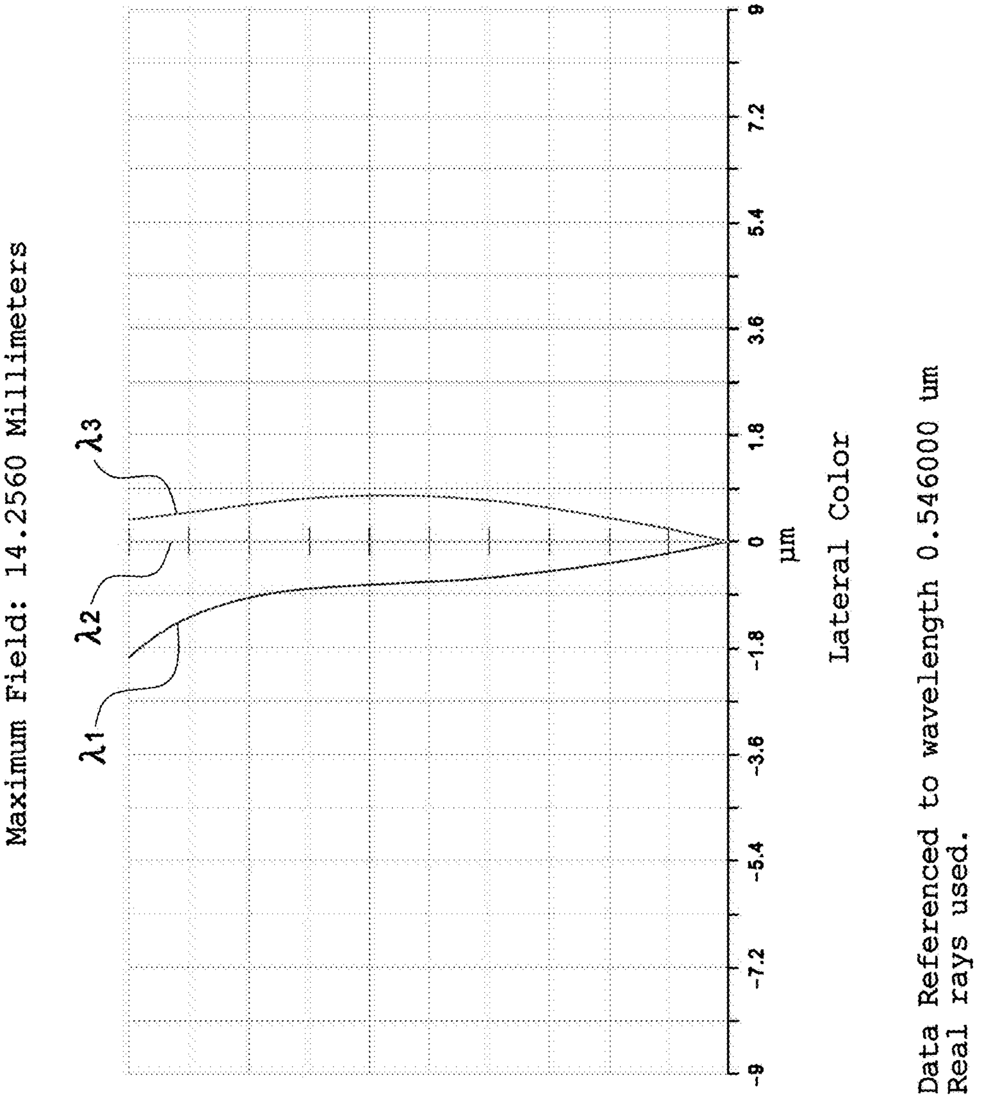
FIG. 1J is a graph illustrating the lateral color aberration of the telephoto end of the first embodiment of the present invention.

The wide-angle end of the high brightness zoom projection lens 10 uses a first wavelength λ1 of 620 nm, a second wavelength λ2 of 546 nm and a third wavelength λ3 of 455 nm to simulate different transverse ray fan plot as shown in FIG. 1G, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −70 um~70 um; The field curvature diagram in FIG. 1H has a maximum field of view of 20.890 degrees, curves T and S are respectively the tangential field curvature characteristic curve and the sagittal field curvature characteristic curve, the tangential field curvature value and sagittal field curvature value are controlled within the range of −0.06 mm~0.03 mm; The distortion diagram in FIG. 1I has a maximum field of view of 20.890 degrees, and the distortion amount is controlled within the range of −0.6%~0; The lateral color aberration diagram in FIG. 1J has a maximum field of view of 14.256 mm, and using a wavelength of about 0.546 microns as a reference, the lateral color aberration value is controlled within the range of −2.4 um~0.9 um.

Figure 2A:
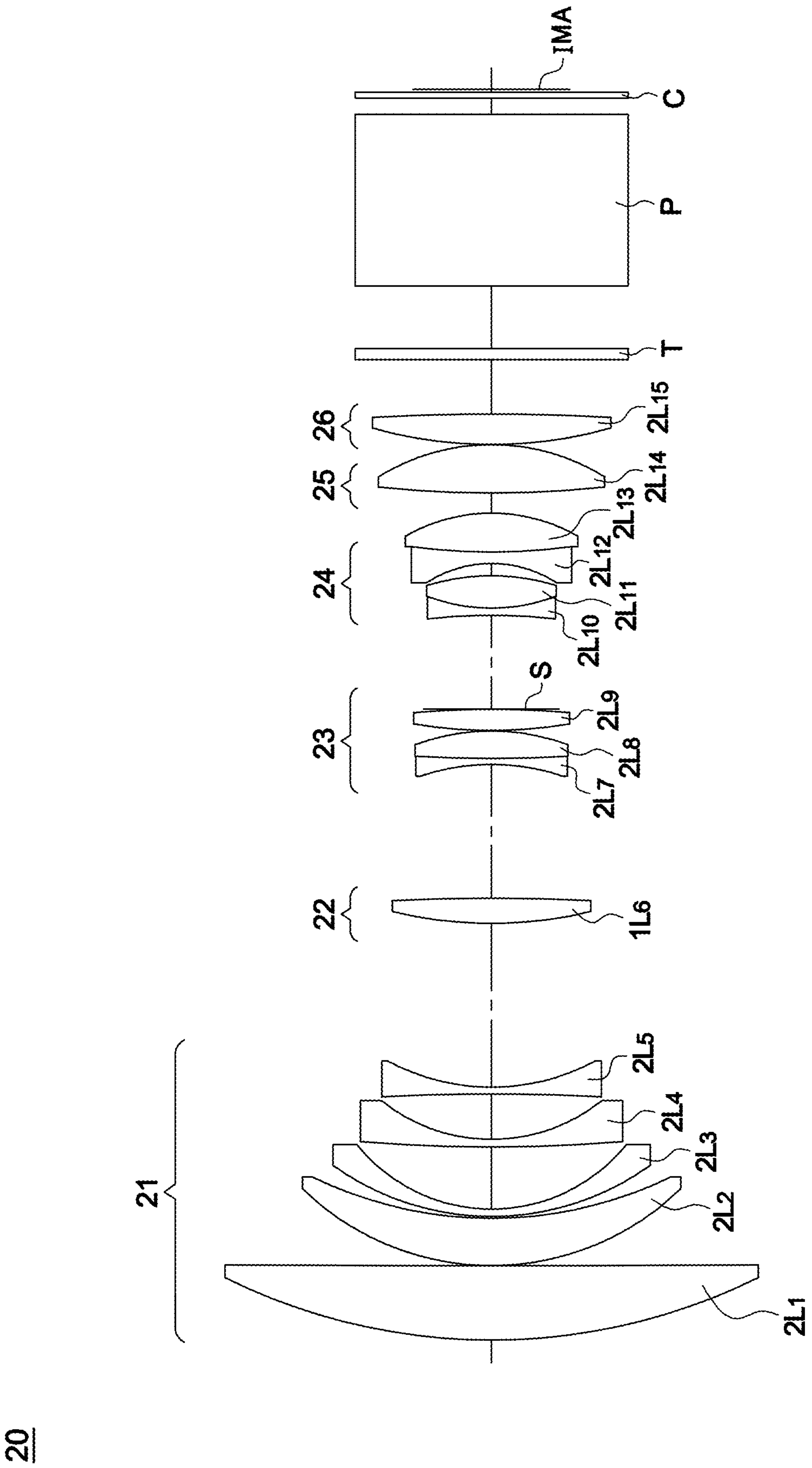
FIG. 2A is a schematic diagram illustrating lenses arrangement of the wide-angle end of the second embodiment of the present invention.
Figure 2B:
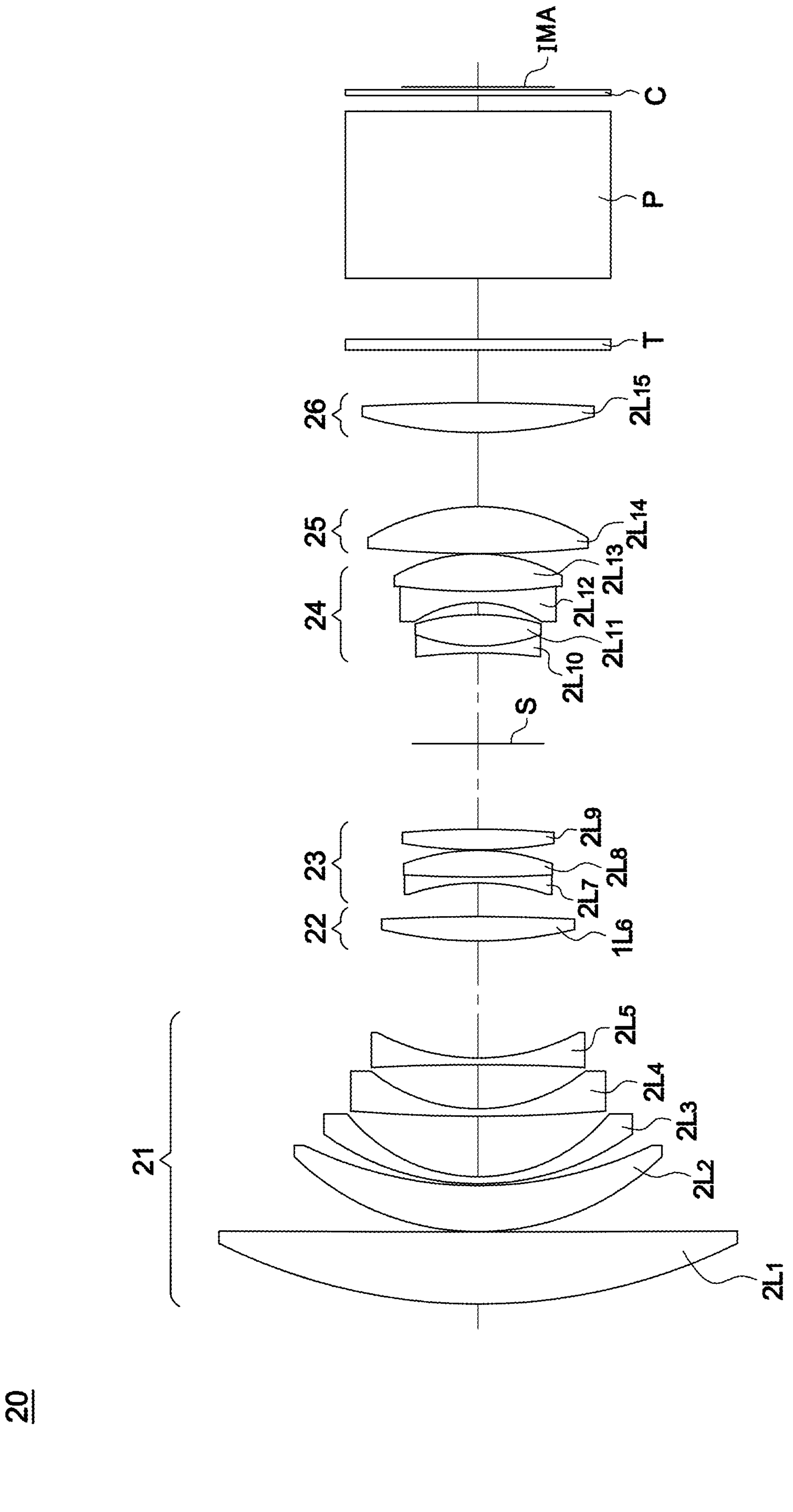
FIG. 2B is a schematic diagram illustrating lenses arrangement of the telephoto end of the second embodiment of the present invention.

Referring to FIGS. 2A and 2B, the second embodiment of the present invention includes a high brightness zoom projection lens 20, which all lenses are made of glass lenses, the focal length Ft of the telephoto end is 37.90, the focal length Fw of the wide-angle end is 25.61, Ft/Fw=1.48, and from the magnifying side to the narrowing side of the lens sequentially comprising: a first lens group 21, having negative diopter and a focal length value F1=−37.93, F1/Fw=−1.48, being a fixed group when zooming, the first lens group 21 has a first lens 2L1, a second lens 2L2, a third lens 2L3, a fourth lens 2L4 and a fifth lens 2L5 in sequence, and a first lens 2L1 close to the magnifying side has positive diopter and a focal length value FL=235.22;

- a second lens group 22, having positive diopter and a focal length value F2=78.63, F2/Fw=3.07, being a movable group when zooming, the second lens group 22 has a sixth lens 2L6;
- a third lens group 23, having positive diopter and a focal length value F3=72.32, F3/Fw=2.82, being a movable group when zooming, and the amount of movement is the largest, third lens group 23 has a seventh lens 2L7, an eighth lens 2L8 and a ninth lens 2L9 in sequence;
- a fourth lens group 24, having negative diopter and a focal length value (F4)=−49.83, F4/Fw=−1.95, being a movable group when zooming, and the fourth lens group 24 has a tenth lens 2L10, an eleventh lens 2L11, a twelfth lens 2L12 and a thirteenth lens 2L13 in sequence;
- a fifth lens group 25, having positive diopter and a focal length value (F5)=72.74, F5/Fw=2.84, being a movable group when zooming, and the fifth lens group 25 has a fourteenth lens 2L14;
- a sixth lens group 26, having positive diopter and a focal length value (F6)=76.90, F6/Fw=3.00, being a fixed group when zooming, and the sixth lens group 26 has a fifteenth lens 2L15, and the Abbe number of the fifteenth lens 2L15 (the last lens) close to the narrowing side is 18.90; and
- a transmissive smooth picture actuator T is arranged sequentially behind the fifteenth lens 2L15, which is a glass plate device that can rotate rapidly and minutely, it synthesizes and improves the resolution through image shifting, and sequentially arranges a prism P, a cover glass C and an image source IMA behind the transmissive smooth picture actuator T.

In addition, all lenses of the high brightness zoom projection lens 20 are spherical lenses, and an aperture S is set between the third lens group 23 and the fourth lens group 24, and the F value of the aperture S is 2.0; The effective diameter CA of the first lens 2L1 is 100.00, the distance TTL from the top point of the first lens 2L1 to the image source on the narrowing side is 220.00, and the maximum image height IMH on the narrowing side of the lens is 14.50, CA/IMH=6.390, TTL/Fw=8.59.

The lens parameters design of the high brightness zoom projection lens 20 are shown in Table 2A and Table 2B below; Wherein 2L8R1 is the magnifying side surface R1 of the first lens 2L1, and 2L1R2 is the narrowing side surface R2 of the first lens 2L1, 2L2R1 is the magnifying side surface R1 of the second lens 2L2, 2L2R2 is the narrowing side surface R2 of the second lens 2L2, . . . 2L15R1 is the magnifying side surface R1 of the fifteenth lens 2L15, 2L15R2 is the narrowing side surface R2 ofthe fifteenth lens 2L15, and so on.

However, the seventh lens 2L7 and the eighth lens 2L8 can form a doublet or an achromatic doublet, the tenth lens 2L10 and the eleventh lens 2L11 can form a doublet or an achromatic doublet, and the twelfth lens 2L12 and the thirteenth lens 2L13 can form a doublet or an achromatic doublet

| 2A | | | | |
|---|---|---|---|---|
| Comment | Radius(mm) | Thickness(mm) | Nd | Vd |
| 2L1R1 | 114.19 | 12.97 | 1.50 | 81.61 |
| 2L1R2 | 4217.39 | 0.20 | | |
| 2L2R1 | 51.70 | 8.32 | 1.85 | 23.79 |
| 2L2R2 | 78.50 | 0.29 | | |
| 2L3R1 | 51.91 | 1.20 | 1.77 | 49.61 |
| 2L3R2 | 32.55 | 11.17 | | |
| 2L4R1 | 310.35 | 1.20 | 1.80 | 46.57 |
| 2L4R2 | 33.61 | 7.99 | | |
| 2L5R1 | −488.18 | 1.20 | 1.50 | 81.61 |
| 2L5R2 | 41.01 | A | | |
| 2L6R1 | 79.10 | 4.45 | 1.85 | 23.79 |
| 2L6R2 | −436.45 | B | | |
| 2L7R1 | −42.78 | 1.20 | 1.76 | 27.51 |
| 2L8R1 | 277.29 | 4.62 | 1.80 | 46.57 |
| 2L8R2 | −46.88 | 0.20 | | |
| 2L9R1 | 96.78 | 3.59 | 1.80 | 46.57 |
| 2L9R2 | −190.18 | C | | |
| APERTURE | INF | 16.53 | | |
| 2L10R1 | −94.74 | 1.20 | 1.85 | 30.06 |
| 2L11R1 | 35.81 | 5.64 | 1.50 | 81.61 |
| 2L11R2 | −42.57 | 2.08 | | |
| 2L12R1 | −23.79 | 2.11 | 1.69 | 31.08 |
| 2L13R1 | 116.61 | 6.91 | 1.50 | 81.61 |
| 2L13R2 | −32.73 | D | | |
| 2L14R1 | 270.44 | 8.08 | 1.50 | 81.61 |
| 2L14R2 | −41.45 | E | | |
| 2L15R1 | 83.81 | 5.35 | 1.92 | 18.90 |
| 2L15R2 | −487.89 | 9.53 | | |

| 2B | | |
|---|---|---|
| Zoom | Wide | Tele |
| A | 28.72 | 20.89 |
| B | 24.38 | 6.20 |
| C | 0.20 | 15.50 |
| D | 3.76 | 0.20 |
| E | 0.20 | 13.58 |

Figure 2C:
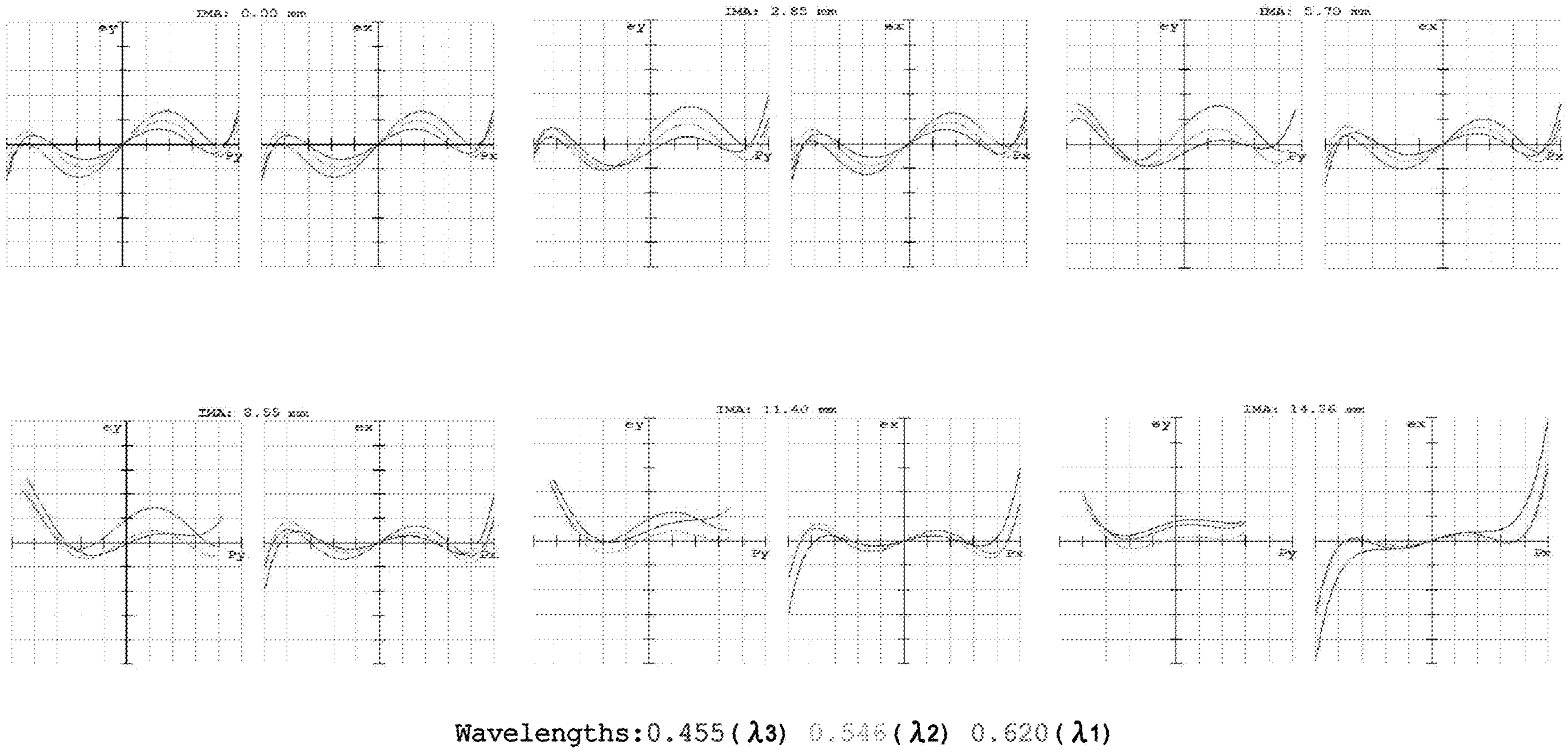
FIG. 2C is a graph illustrating the transverse ray fan plot of the wide-angle end of the second embodiment of the present invention.
Figure 2D:
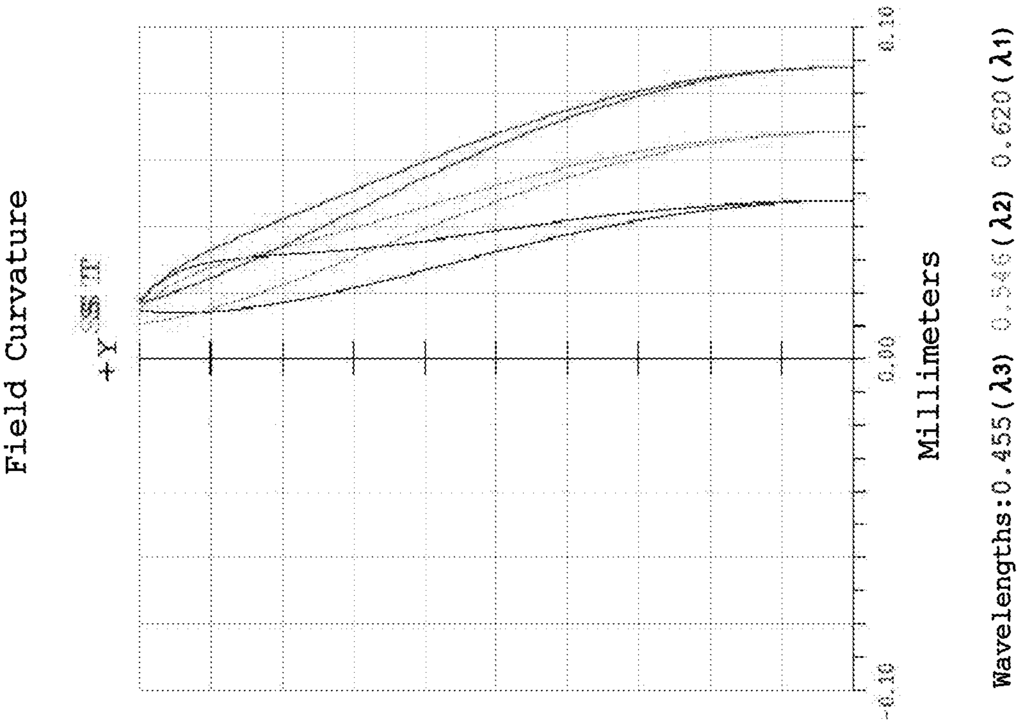
FIG. 2D is a graph illustrating the field curvature of the wide-angle end of the second embodiment of the present invention.
Figure 2E:
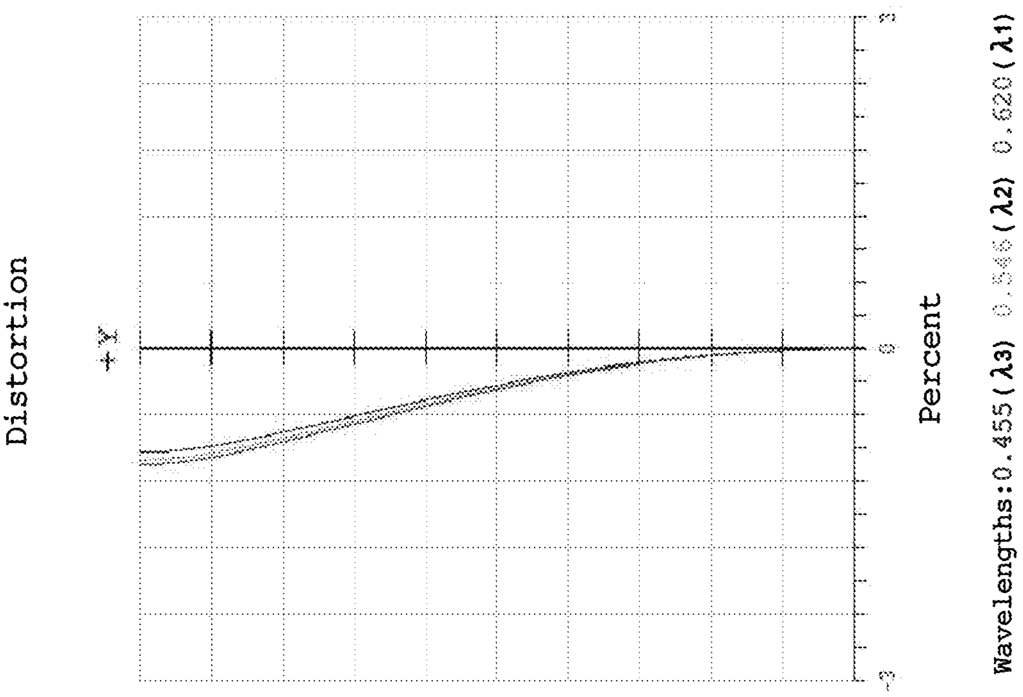
FIG. 2E is a graph illustrating the distortion of the wide-angle end of the second embodiment of the present invention.
Figure 2F:
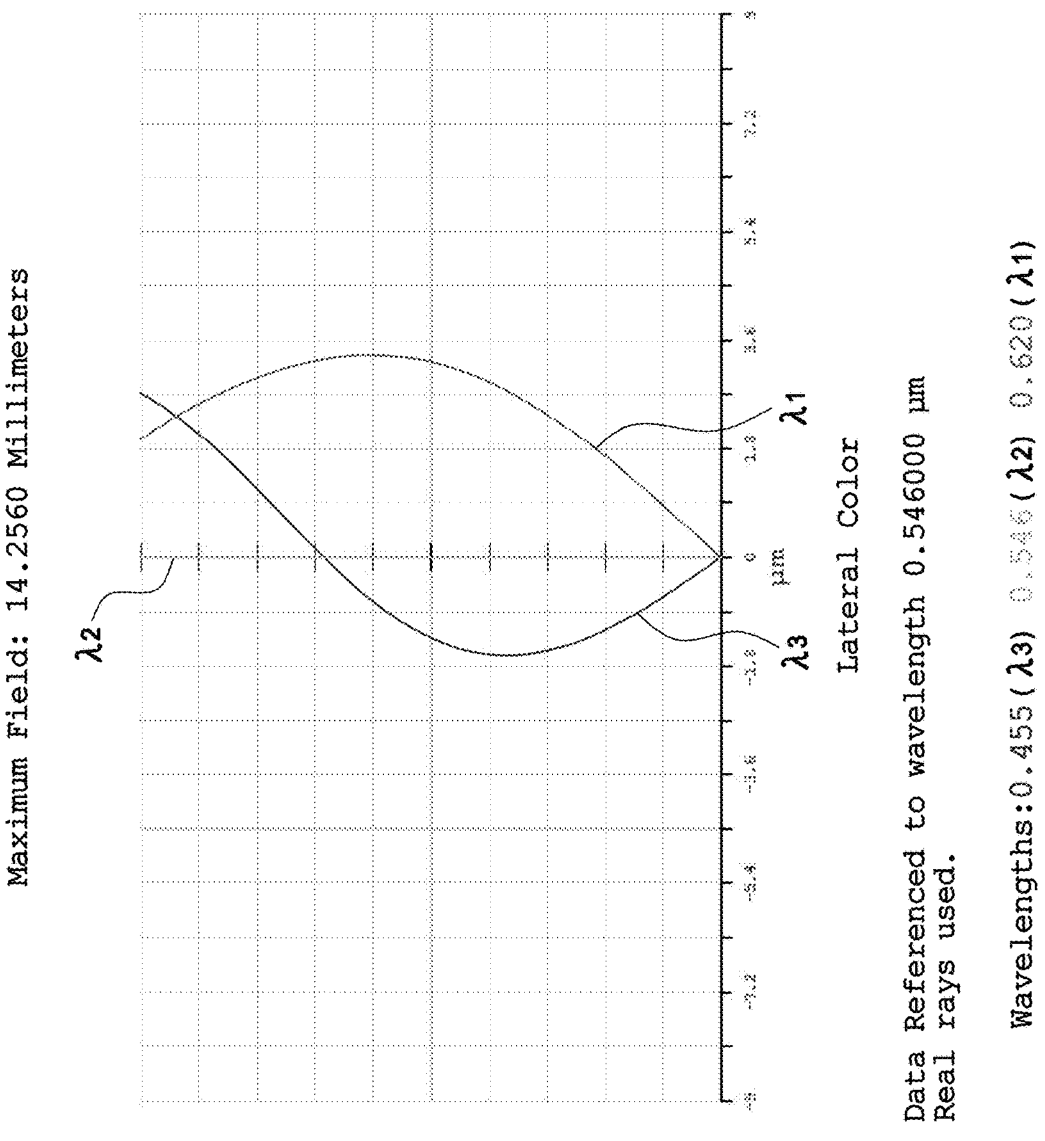
FIG. 2F is a graph illustrating the lateral color aberration of the wide-angle end of the second embodiment of the present invention.

The wide-angle end of the high brightness zoom projection lens 20 uses a first wavelength λ1 of 620 nm, a second wavelength λ2 of 546 nm and a third wavelength λ3 of 455 nm to simulate different transverse ray fan plot as shown in FIG. 2C, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −20 um~20 um; The field curvature diagram in FIG. 2D has a maximum field of view of 29.231 degrees, curves T and S are respectively the tangential field curvature characteristic curve and the sagittal field curvature characteristic curve, the tangential field curvature value and sagittal field curvature value are controlled within the range of 0.00 mm~0.09 mm; The distortion diagram in FIG. 2E has a maximum field of view of 29.231 degrees, and the distortion amount is controlled within the range of −1.2%~0; The lateral color aberration diagram in FIG. 2F has a maximum field of view of 14.256 mm, and using a wavelength of about 0.546 microns as a reference, the lateral color aberration value is controlled within the range of −1.8 um~3.6 um.

Figure 2G:
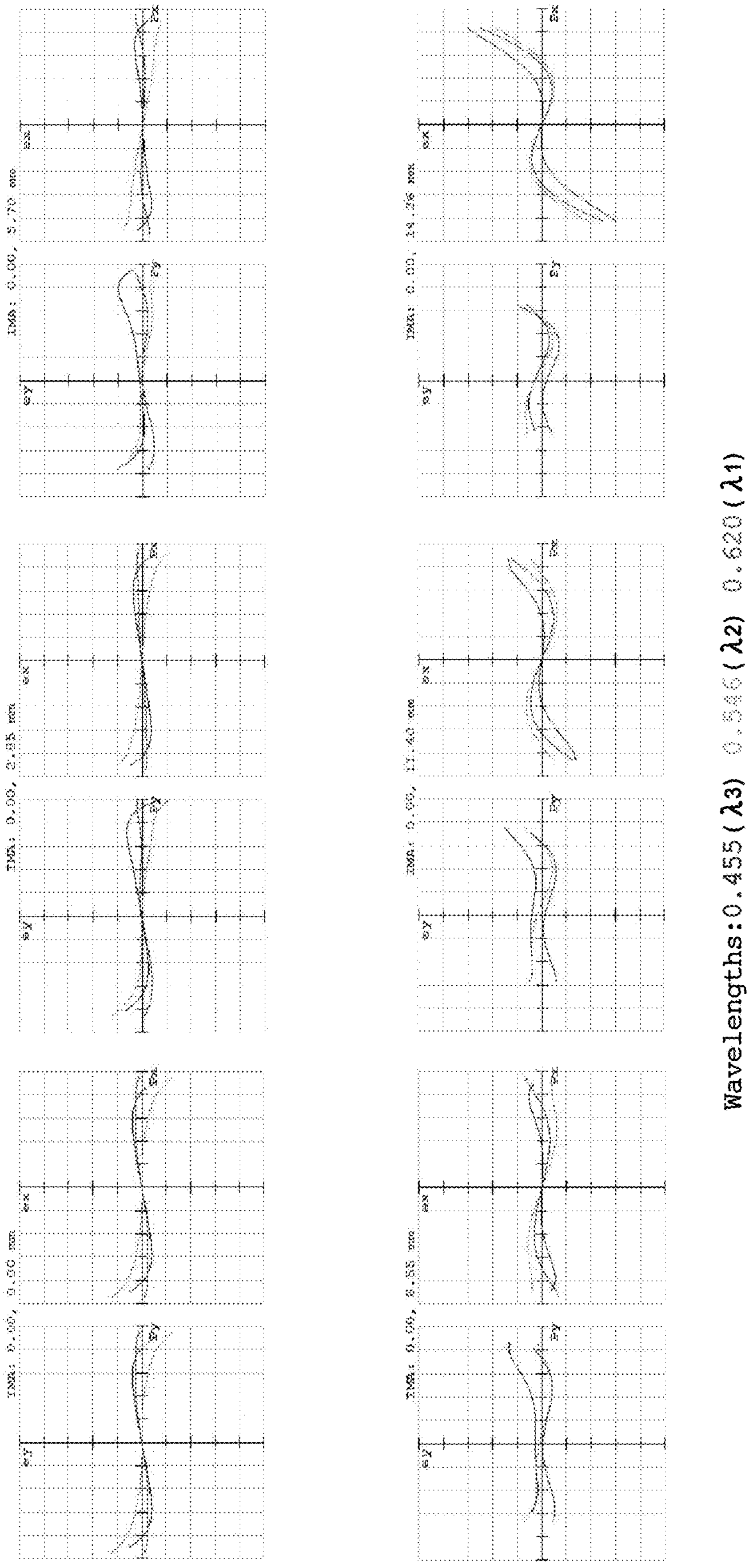
FIG. 2G is a graph illustrating the transverse ray fan plot of the telephoto end of the second embodiment of the present invention.
Figure 2H:
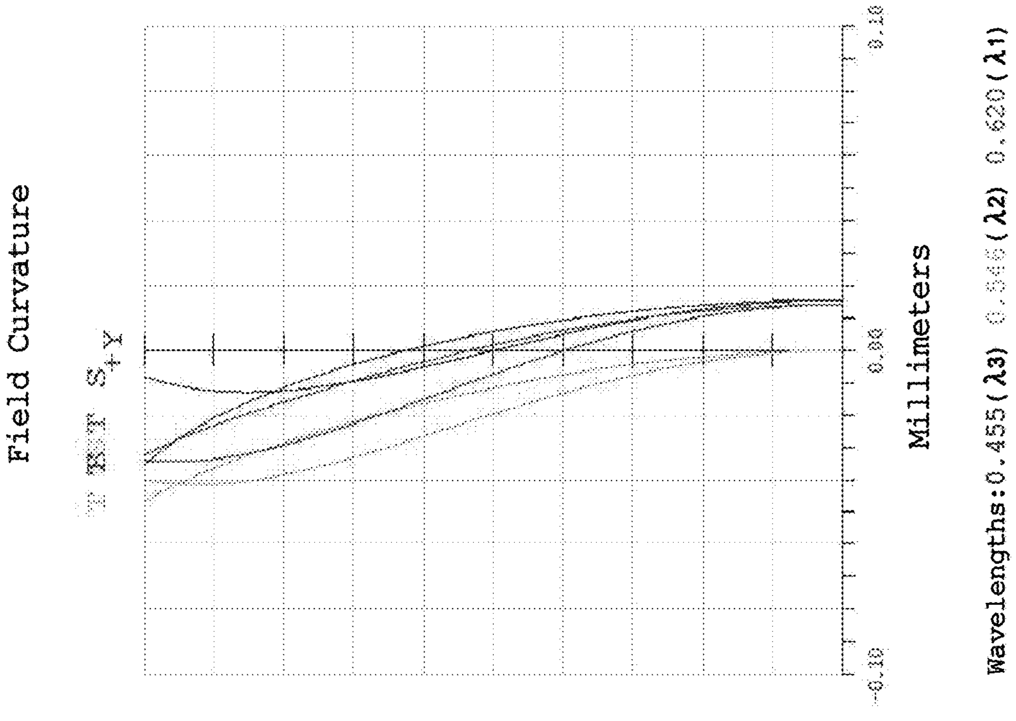
FIG. 2H is a graph illustrating the field curvature of the telephoto end of the second embodiment of the present invention.
Figure 2I:
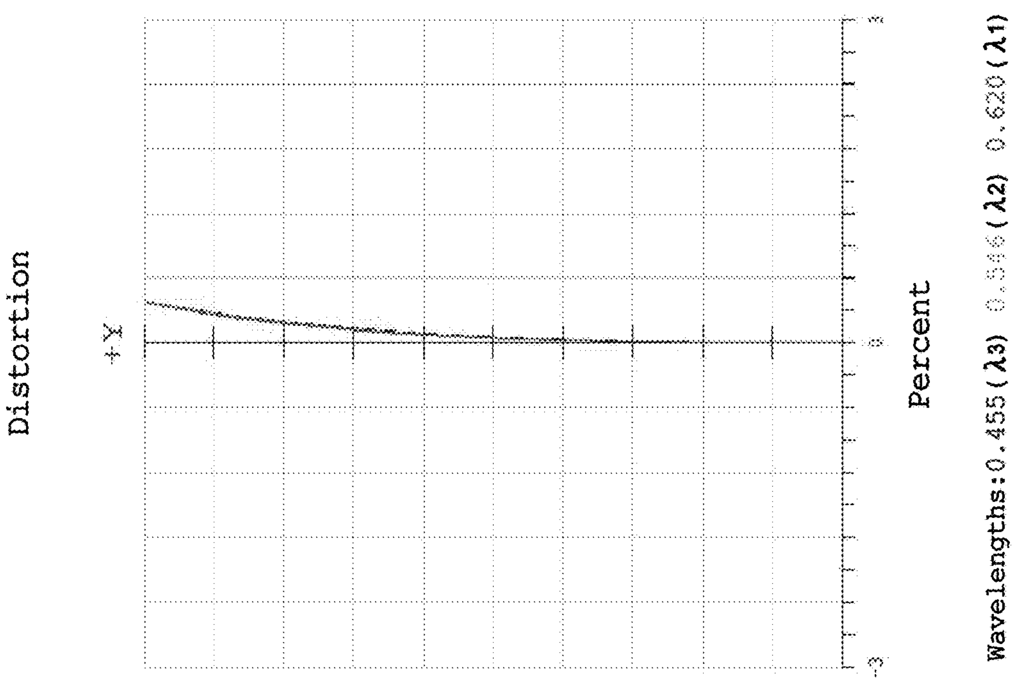
FIG. 2I is a graph illustrating the distortion of the telephoto end of the second embodiment of the present invention.
Figure 2J:
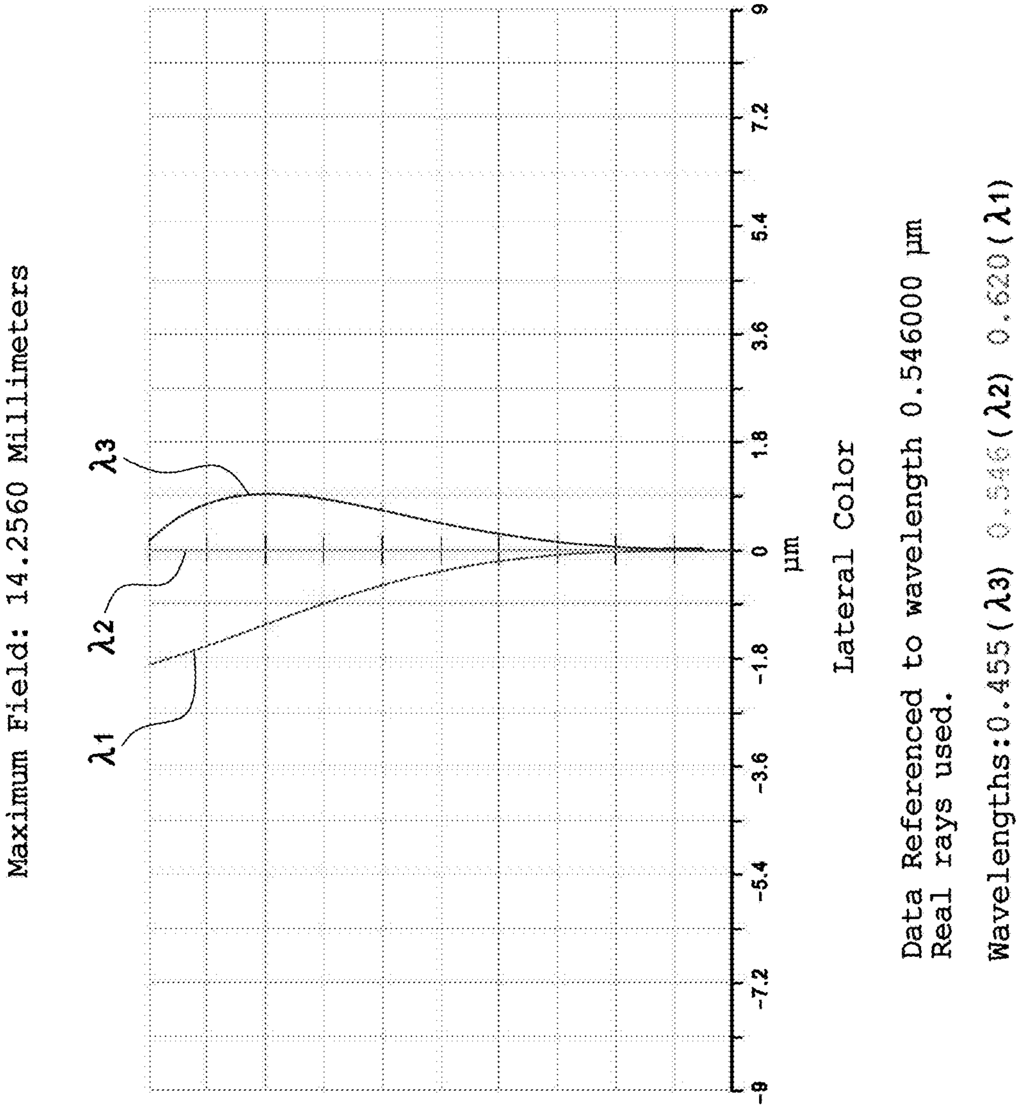
FIG. 2J is a graph illustrating the lateral color aberration of the telephoto end of the second embodiment of the present invention.

The wide-angle end of the high brightness zoom projection lens 20 uses a first wavelength λ1 of 620 nm, a second wavelength λ2 of 546 nm and a third wavelength λ3 of 455 nm to simulate different transverse ray fan plot as shown in FIG. 2G, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −12 um~12 um; The field curvature diagram in FIG. 2H has a maximum field of view of 20.520 degrees, curves T and S are respectively the tangential field curvature characteristic curve and the sagittal field curvature characteristic curve, the tangential field curvature value and sagittal field curvature value are controlled within the range of −0.05 mm~0.02 mm; The distortion diagram in FIG. 2I has a maximum field of view of 20.520 degrees, and the distortion amount is controlled within the range of 0~0.6%; The lateral color aberration diagram in FIG. 2J has a maximum field of view of 14.256 mm, and using a wavelength of about 0.546 microns as a reference, the lateral color aberration value is controlled within the range of −2.0 um~1.0 um.

Figure 3A:
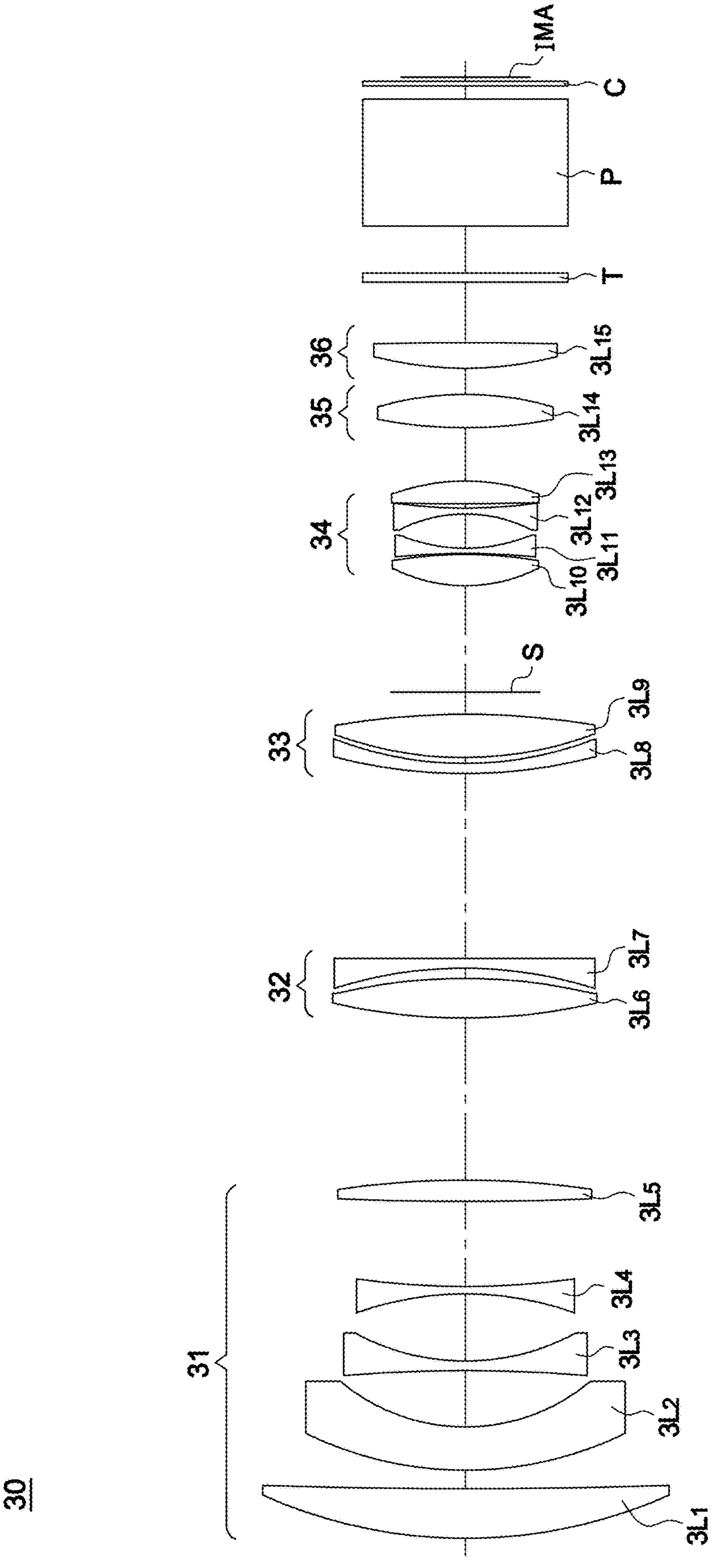
FIG. 3A is a schematic diagram illustrating lenses arrangement of the wide-angle end of the third embodiment of the present invention.
Figure 3B:
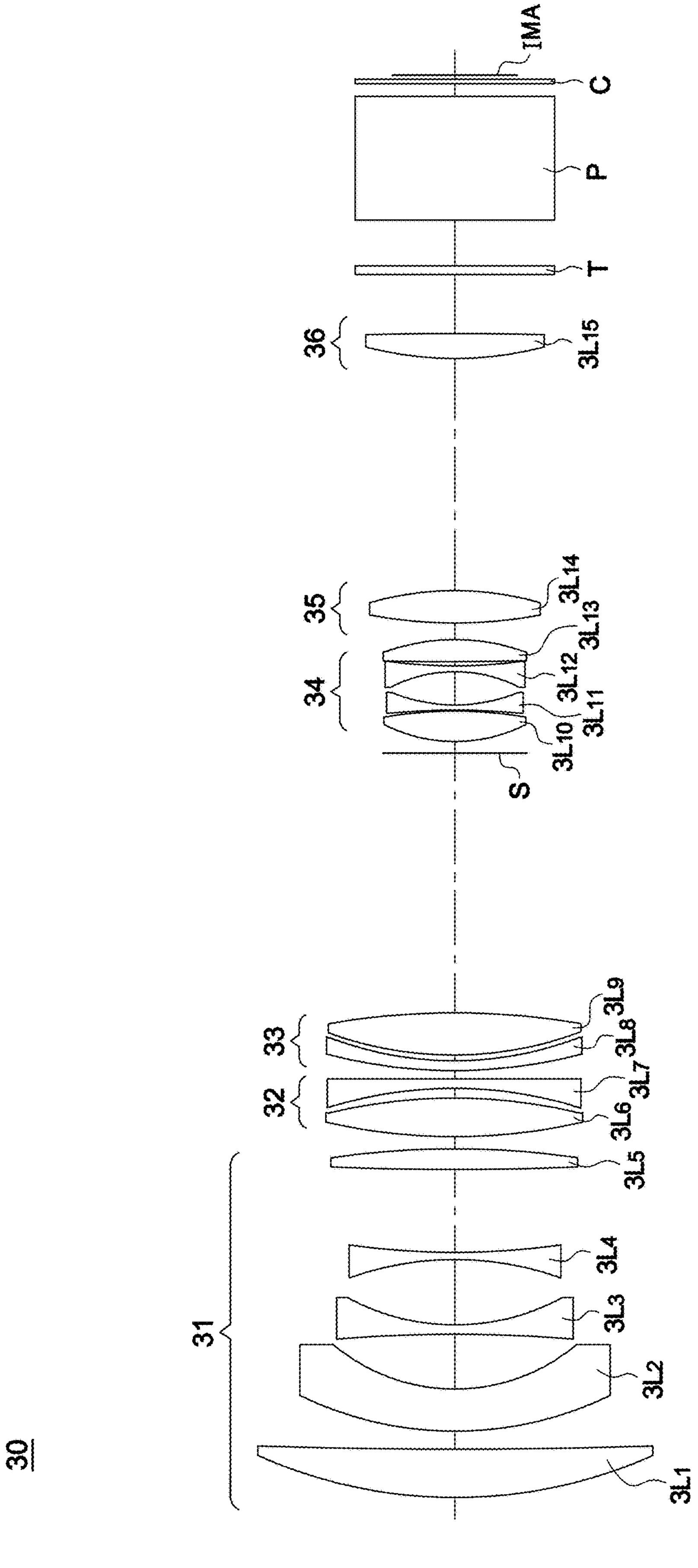
FIG. 3B is a schematic diagram illustrating lenses arrangement of the telephoto end of the third embodiment of the present invention.

Referring to FIGS. 3A and 3B, the third embodiment of the present invention includes a high brightness zoom projection lens 30, which all lenses are made of glass lenses, the focal length Ft of the telephoto end is 71.60, the focal length Fw of the wide-angle end is 37.51, Ft/Fw=1.91, and from the magnifying side to the narrowing side of the lens sequentially comprising:

a first lens group 31, having negative diopter and a focal length value F1=−83.37, F1/Fw=−2.22, being a fixed group when zooming, the first lens group 31 has a first lens 3L1, a second lens 3L2, a third lens 3L3, a fourth lens 3L4 and a fifth lens 3L5 in sequence, and a first lens 3L1 close to the magnifying side has positive diopter and a focal length value FL=181.36;

a second lens group 32, having positive diopter and a focal length value F2=197.34, F2/Fw=5.56, being a movable group when zooming, the second lens group 32 has a sixth lens 3L6 a and a seventh lens 3L7;

a third lens group 33, having positive diopter and a focal length value F3=144.67, F3/Fw=3.86, being a movable group when zooming, and the amount of movement is the largest, third lens group 33 has an eighth lens 3L8 and a ninth lens 3L9 in sequence;

a fourth lens group 34, having negative diopter and a focal length value (F4)=−106.26, F4/Fw=−2.83, being a movable group when zooming, and the fourth lens group 34 has a tenth lens 3L10, an eleventh lens 3L11, a twelfth lens 3L12 and a thirteenth lens 3L13 in sequence;

a fifth lens group 35, having positive diopter and a focal length value (F5)=112.58, F5/Fw=3.00, being a movable group when zooming, and the fifth lens group 35 has a fourteenth lens 3L14;

a sixth lens group 36, having positive diopter and a focal length value (F6)=92.15, F6/Fw=2.46, being a fixed group when zooming, and the sixth lens group 36 has a fifteenth lens 3L15, and the Abbe number of the fifteenth lens 3L15 (the last lens) close to the narrowing side is 17.94; and a transmissive smooth picture actuator T is arranged sequentially behind the fifteenth lens 3L15, which is a glass plate device that can rotate rapidly and minutely, it synthesizes and improves the resolution through image shifting, and sequentially arranges a prism P, a cover glass C and an image source IMA behind the transmissive smooth picture actuator T.

In addition, all lenses of the high brightness zoom projection lens 30 are spherical lenses, and an aperture S is set between the third lens group 33 and the fourth lens group 34, and the F value of the aperture S is 2.0; The effective diameter CA of the first lens 3L1 is 98.80, the distance TTL from the top point of the first lens 3L1 to the image source on the narrowing side is 343.00, and the maximum image height IMH on the narrowing side of the lens is 14.50, CA/IMH=6.81, TTL/Fw=9.14.

The lens parameters design of the high brightness zoom projection lens 30 are shown in Table 3A and Table 3B below; Wherein 3L1R1 is the magnifying side surface R1 of the first lens 3L1, and 3L1R2 is the narrowing side surface R2 of the first lens 3L1, 3L2R1 is the magnifying side surface R1 of the second lens 3L2, 3L2R2 is the narrowing side surface R2 of the second lens 3L2, . . . 3L15R1 is the magnifying side surface R1 of the fifteenth lens 3L15, 3L15R2 is the narrowing side surface R2 of the fifteenth lens 3L15, and so on.

3A

| Comment | Radius(mm) | Thickness(mm) | Nd | Vd |
|---|---|---|---|---|
| 3L1R1 | 123.05 | 11.62 | 1.77 | 49.60 |
| 3L1R2 | 937.13 | 4.60 | | |
| 3L2R1 | 94.23 | 10.00 | 1.59 | 61.25 |
| 3L2R2 | 47.96 | 13.31 | | |
| 3L3R1 | −331.58 | 2.10 | 1.64 | 60.20 |
| 3L3R2 | 58.79 | 15.69 | | |
| 3L4R1 | −84.65 | 1.85 | 1.55 | 63.37 |
| 3L4R2 | 201.87 | 20.12 | | |
| 3L5R1 | 793.61 | 4.80 | 1.95 | 17.94 |
| 3L5R2 | −235.85 | A | | |
| 3L6R1 | 143.77 | 9.33 | 1.83 | 42.73 |
| 3L6R2 | −143.77 | 2.49 | | |
| 3L7R1 | −106.36 | 2.25 | 1.69 | 31.16 |
| 3L7R2 | 2226.97 | B | | |
| 3L8R1 | 132.99 | 2.25 | 1.67 | 32.17 |
| 3L8R2 | 90.89 | 1.48 | | |
| 3L9R1 | 95.68 | 10.11 | 1.59 | 68.34 |
| 3L9R2 | −191.11 | C | | |
| APERTURE | INF | D | | |
| 3L10R1 | 42.98 | 7.37 | 1.60 | 65.46 |
| 3L10R2 | −110.31 | 0.10 | | |
| 3L11R1 | −163.72 | 1.25 | 1.81 | 25.46 |
| 3L11R2 | 44.49 | 8.21 | | |
| 3L12R1 | −36.63 | 1.25 | 1.70 | 30.05 |
| 3L12R2 | 146.79 | 1.01 | | |
| 3L13R1 | 1025.62 | 5.35 | 1.74 | 49.22 |
| 3L13R2 | −53.07 | E | | |
| 3L14R1 | 122.43 | 7.85 | 1.44 | 94.52 |
| 3L14R2 | −81.23 | F | | |
| 3L15R1 | 94.53 | 5.88 | 1.95 | 17.94 |
| 3L15R2 | −1299.14 | 14.36 | | |

3B

| Zoom | Wide | Tele |
|---|---|---|
| A | 38.38 | 3.00 |
| B | 43.62 | 2.00 |
| C | 5.35 | 62.61 |
| D | 25.00 | 3.00 |
| E | 12.26 | 4.00 |
| F | 6.15 | 56.15 |

Figure 3C:
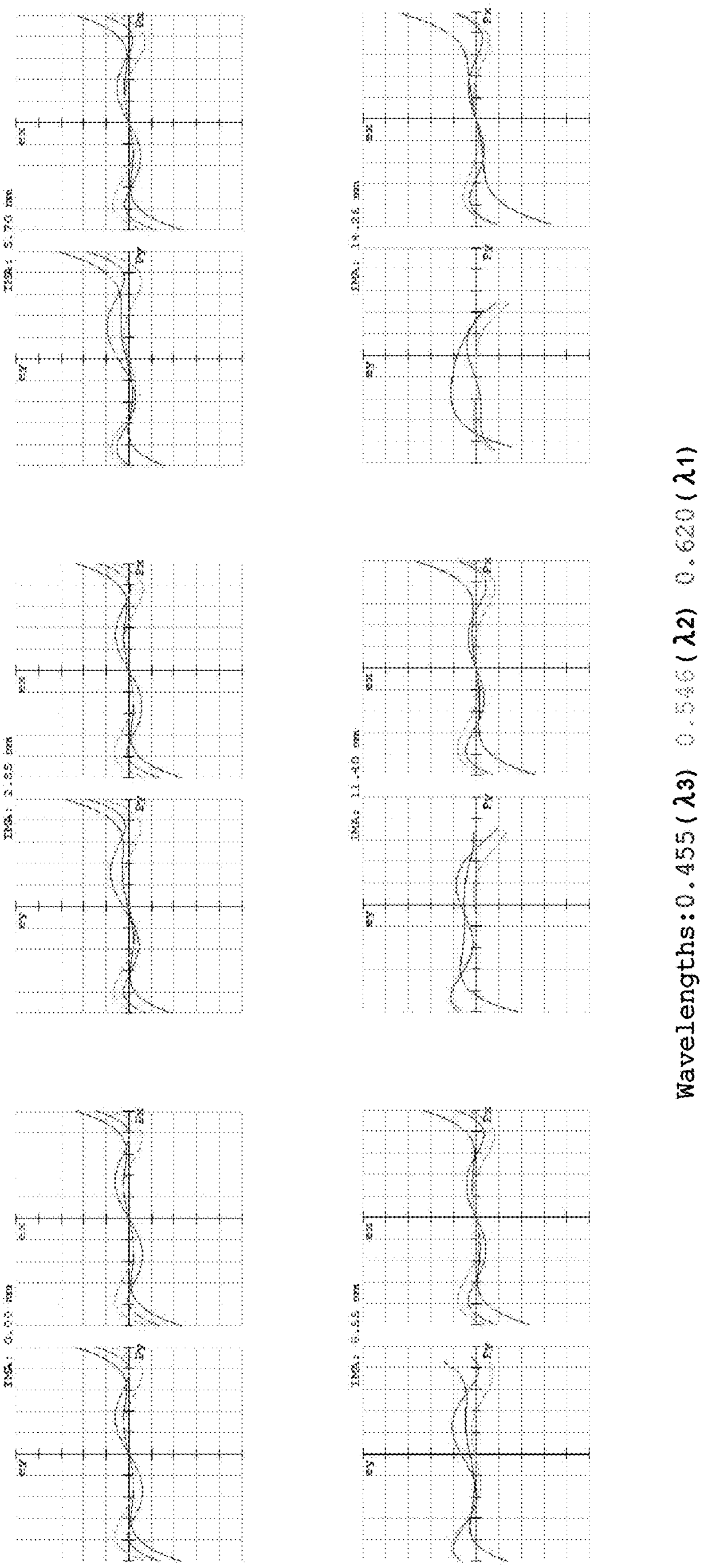
FIG. 3C is a graph illustrating the transverse ray fan plot of the wide-angle end of the third embodiment of the present invention.
Figure 3D:
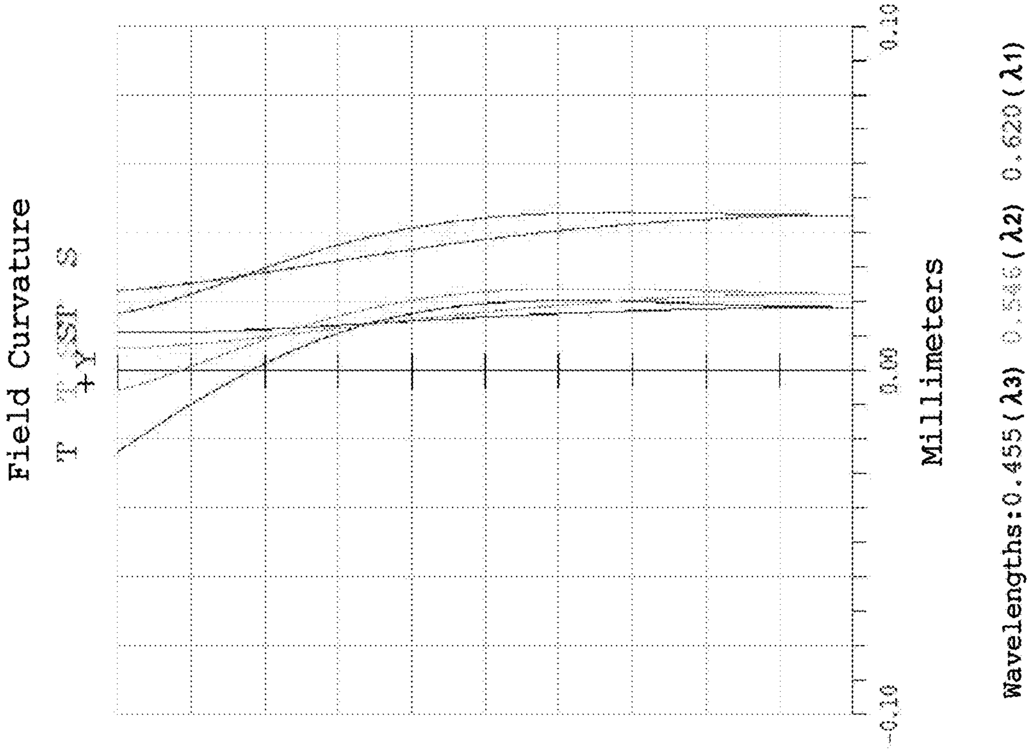
FIG. 3D is a graph illustrating the field curvature of the wide-angle end of the third embodiment of the present invention.
Figure 3E:
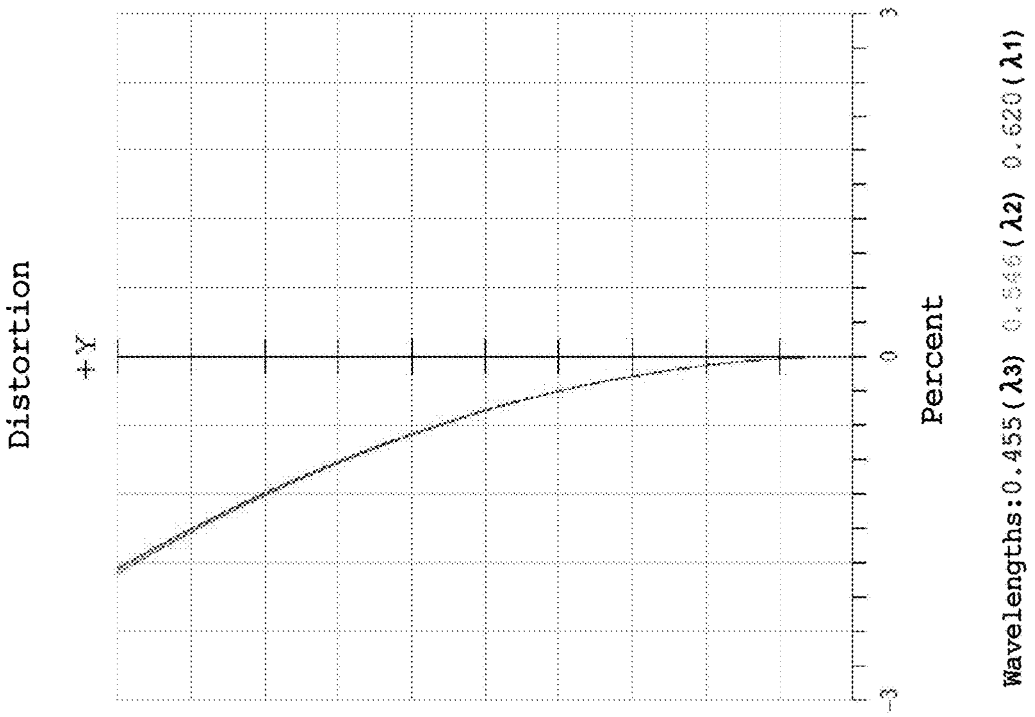
FIG. 3E is a graph illustrating the distortion of the wide-angle end of the third embodiment of the present invention.
Figure 3F:
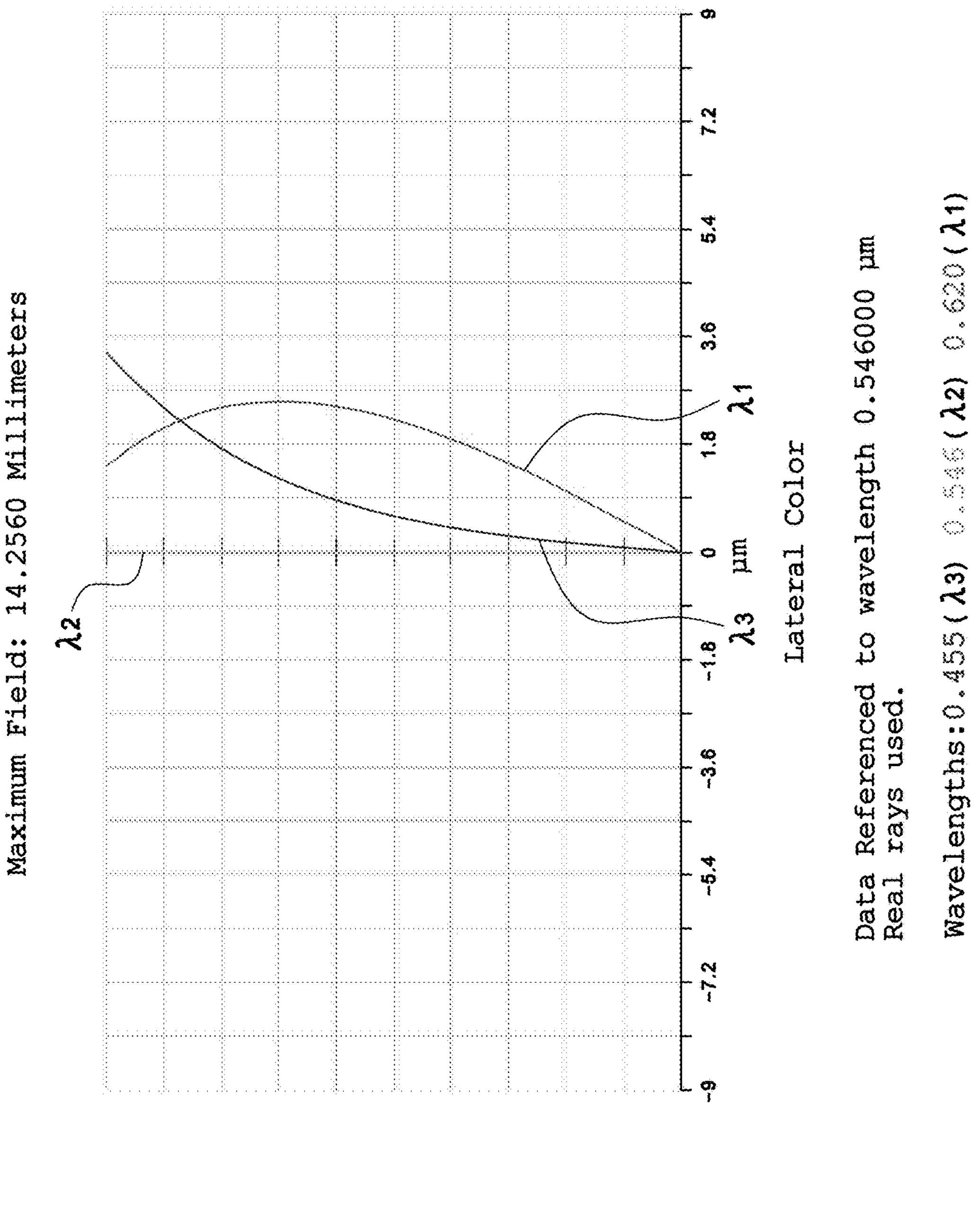
FIG. 3F is a graph illustrating the lateral color aberration of the wide-angle end of the third embodiment of the present invention.
Figure 3G:
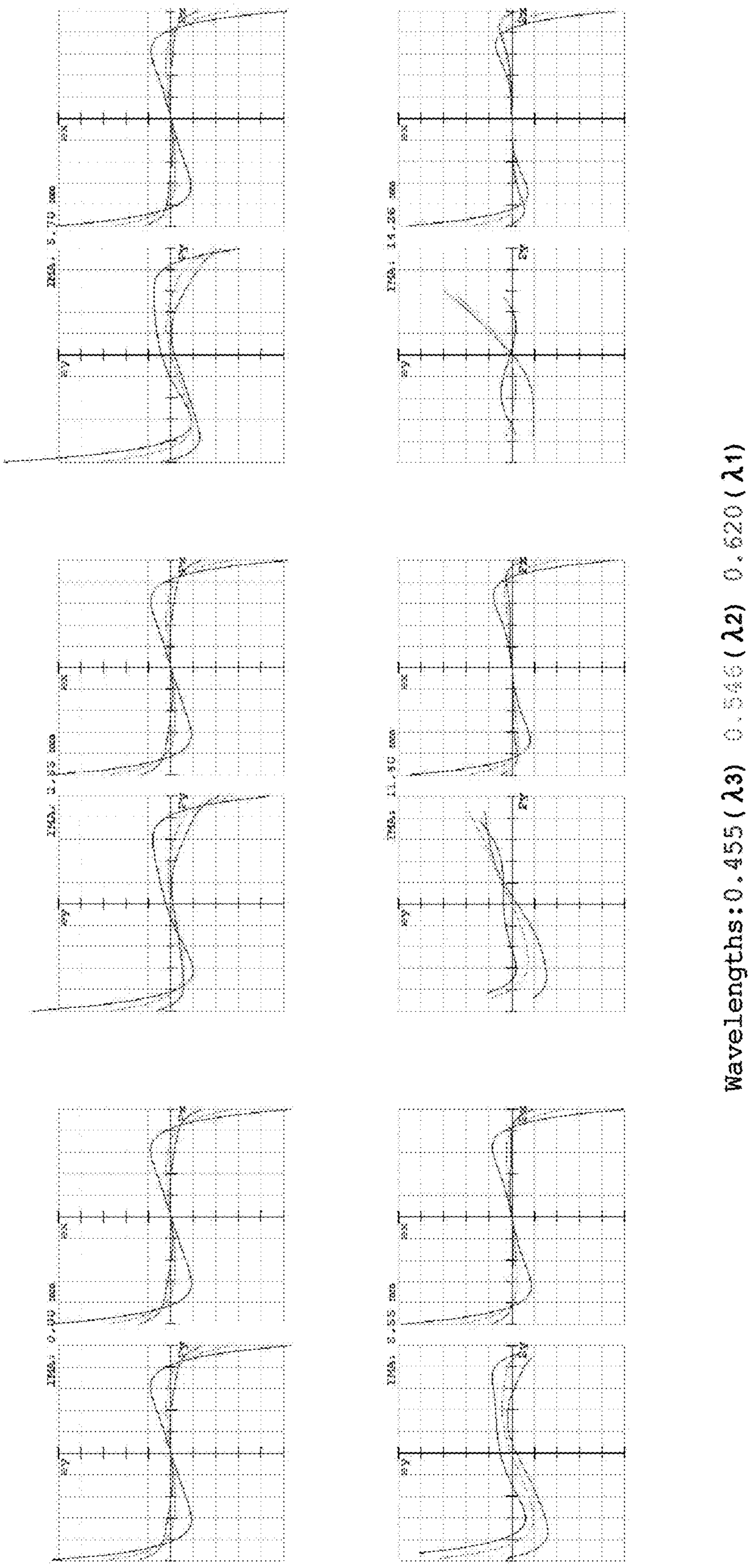
FIG. 3G is a graph illustrating the transverse ray fan plot of the telephoto end of the third embodiment of the present invention.

The wide-angle end of the high brightness zoom projection lens 30 uses a first wavelength λ1 of 620 nm, a second wavelength λ2 of 546 nm and a third wavelength λ3 of 455 nm to simulate different transverse ray fan plot as shown in FIG. 3C, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −16 um~−16 um; The field curvature diagram in FIG. 3D has a maximum field of view of 21.130 degrees, curves T and S are respectively the tangential field curvature characteristic curve and the sagittal field curvature characteristic curve, the tangential field curvature value and sagittal field curvature value are controlled within the range of −0.03 mm~0.05 mm; The distortion diagram in FIG. 3E has a maximum field of view of 21.130 degrees, and the distortion amount is controlled within the range of −2.0%~0; The lateral color aberration diagram in FIG. 3F has a maximum field of view of 14.256 mm, and using a wavelength of about 0.546 microns as a reference, the lateral color aberration value is controlled within the range of 0 um~3.6 um.

Figure 3H:
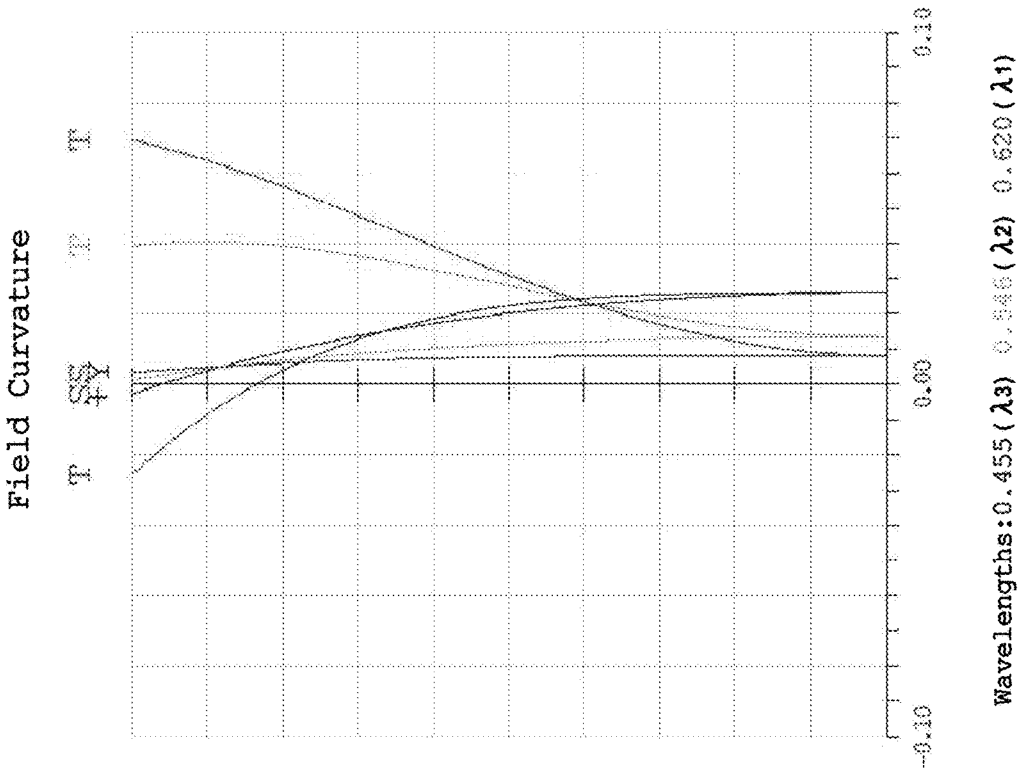
FIG. 3H is a graph illustrating the field curvature of the telephoto end of the third embodiment of the present invention.
Figure 3I:
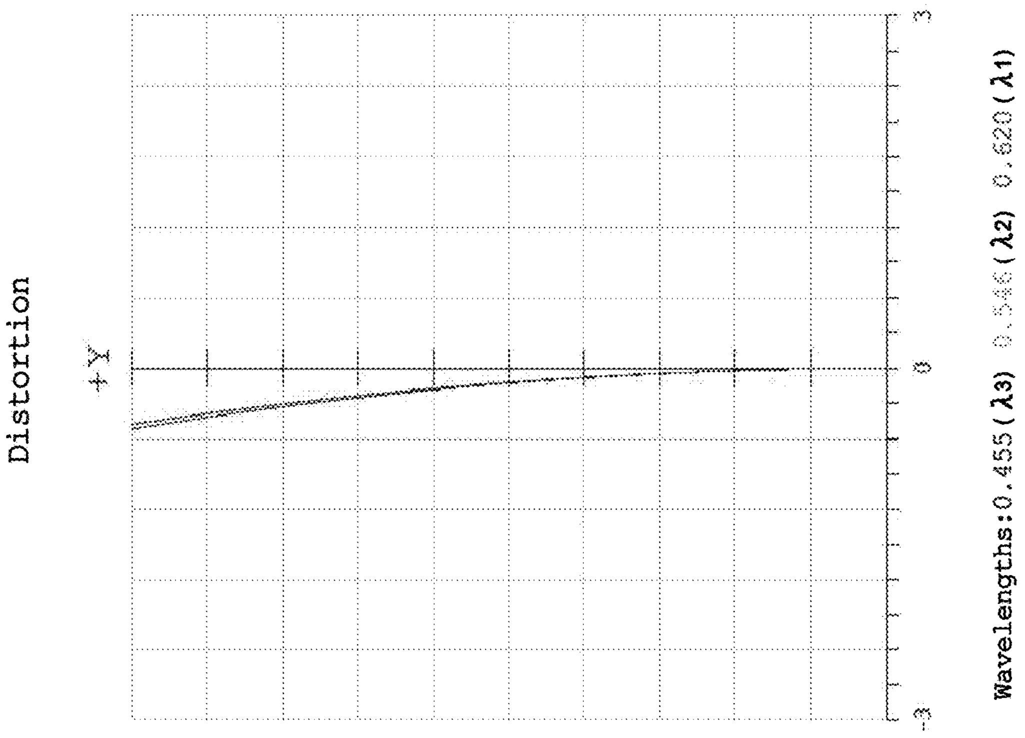
FIG. 3I is a graph illustrating the distortion of the telephoto end of the third embodiment of the present invention.
Figure 3J:
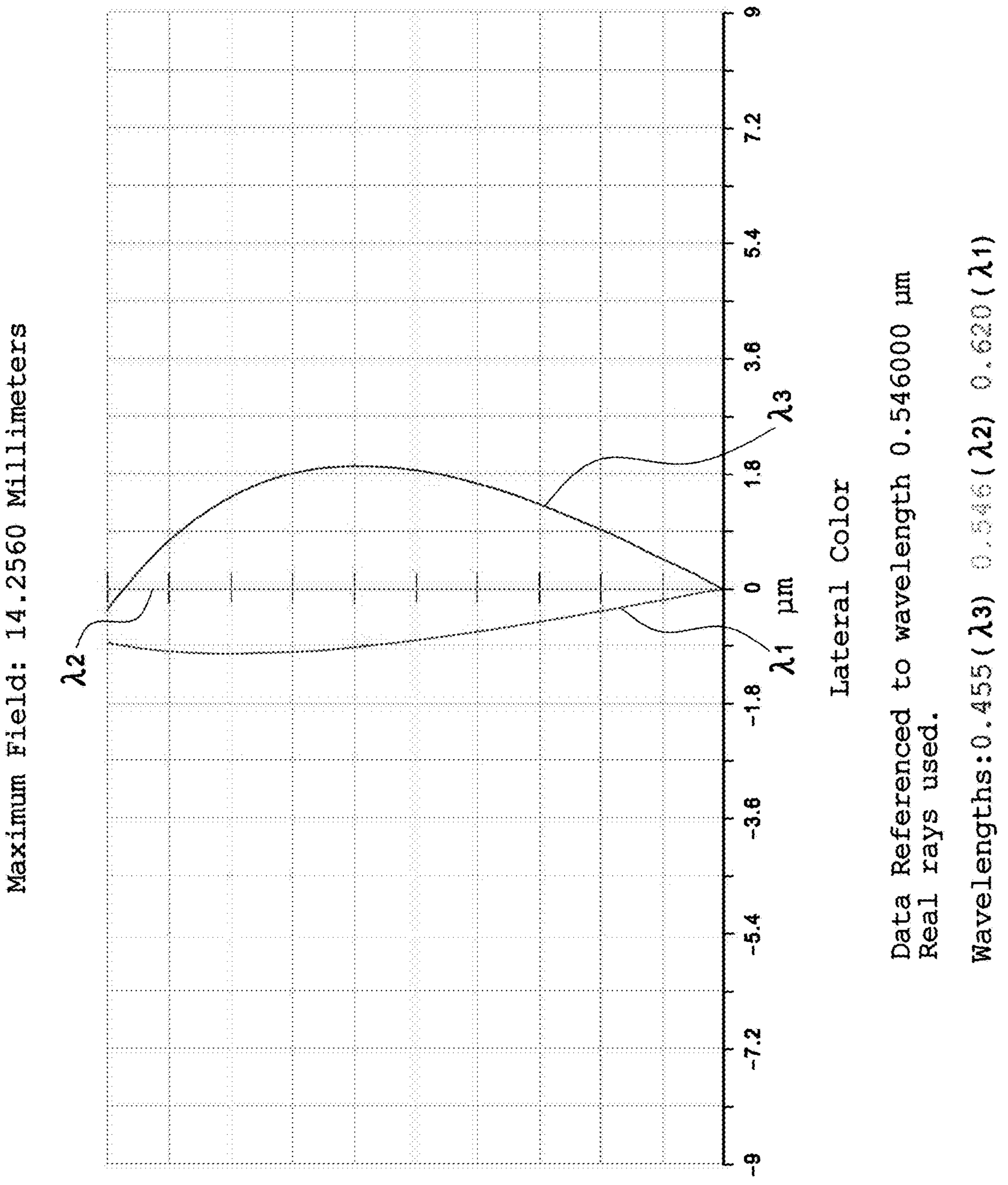
FIG. 3J is a graph illustrating the lateral color aberration of the telephoto end of the third embodiment of the present invention.

The wide-angle end of the high brightness zoom projection lens 30 uses a first wavelength λ1 of 620 nm, a second wavelength λ2 of 546 nm and a third wavelength λ3 of 455 nm to simulate different transverse ray fan plot as shown in FIG. 2G, and the image source IMA presents different image heights of 0.00 mm, 2.85 mm, 5.70 mm, 8.55 mm, 11.40 mm and 14.26 mm respectively. The symbols ey, py, ex and px respectively represent the y-axis lateral aberration, y-axis pupil height, X-axis lateral aberration, x-axis pupil height, wherein maximum scale is ±20.000 um, the generated aberration value is controlled within the range of −30 um~30 um; The field curvature diagram in FIG. 3H has a maximum field of view of 11.300 degrees, curves T and S are respectively the tangential field curvature characteristic curve and the sagittal field curvature characteristic curve, the tangential field curvature value and sagittal field curvature value are controlled within the range of −0.03 mm~0.07 mm; The distortion diagram in FIG. 3I has a maximum field of view of 11.300 degrees, and the distortion amount is controlled within the range of −0.6~0%; The lateral color aberration diagram in FIG. 3J has a maximum field of view of 14.256 mm, and using a wavelength of about 0.546 microns as a reference, the lateral color aberration value is controlled within the range of −1.2 um~2.2 um.

With the feature disclosed above, all lenses of the present invention are made of glass lenses for achieving high brightness projection requirement, a second lens group 12/22/32, a third lens group 13/23/33, a fourth lens group 14/24/34, and a fifth lens group 15/25/35 are movable group for achieving zooming projection requirement, at the same time, the aberration, field curvature, distortion and lateral color aberration of the high brightness zoom projection lenses 10/20/30 can be controlled within a smaller range when they are at the wide-angle end and photography end; therefore, the present invention has the ability to simultaneously satisfy the requirements of high brightness and zoom projection needs and maintain the quality of projection imaging.

Although particular embodiment of the invention has been described in detail for purposes of illustration, various modifications and enhancements may be made without departing from the spirit and scope of the invention. Accordingly, the invention is not to be limited except by the appended claims.

What is claimed is:

1. A high brightness zoom projection lens, which satisfying 2.2>Ft/Fw>1.2, Ft is the focal length at the telephoto end, Fw is the focal length at the wide-angle end, and from the magnifying side to the narrowing side of the lens sequentially comprising:
- a first lens group, having negative diopter, being a fixed group when zooming;
- a second lens group, having positive diopter, being a movable group when zooming;
- a third lens group, having positive diopter, being a movable group when zooming, and the amount of movement is the largest;
- a fourth lens group, having negative diopter, being a movable group when zooming;
- a fifth lens group, having positive diopter, being a movable group when zooming; and
- a sixth lens group, having positive diopter, being a fixed group when zooming;
- wherein the high brightness zoom projection lens satisfies 8.2>CA/IMH>5.8, where CA is the effective diameter of the first lens on the magnifying side and IMH is the maximum image height on the narrowing side.

2. The high brightness zoom projection lens as claimed in claim 1, wherein an aperture is set between the third lens group and the fourth lens group, and the F value of the wide-angle end aperture is between 1.7 and 2.4.

3. The high brightness zoom projection lens as claimed in claim 1, wherein the high brightness zoom projection lens satisfies 10.5>TTL/Fw>7.8, where TTL is the distance from the top point of the first lens on the magnifying side to the image source on the narrowing side, and Fw is the focal length of the wide-angle end.

4. The high brightness zoom projection lens as claimed in claim 1, wherein all lenses of the high brightness zoom projection lens are glass lenses or spherical lenses.

5. The high brightness zoom projection lens as claimed in claim 1, wherein the third lens group or the fourth lens group include a doublet or an achromatic doublet.

6. The high brightness zoom projection lens as claimed in claim 1, wherein the first lens group having a focal length value of F1 satisfying −1.1>F1/Fw>−2.5, the second lens group having a focal length value of F2 satisfying 5.6>F2/Fw>2.8, the third lens group having a focal length value of F3 satisfying 4.2>F3/Fw>2.5, the fourth lens group having a focal length value of F4 satisfying −1.6>F4/Fw>−3.1, the fifth lens group having a focal length value of F5 satisfying 3.6>F5/Fw>2.5, the sixth lens group having a focal length value of F6 satisfying 3.6>F6/Fw>2.2.

7. The high brightness zoom projection lens as claimed in claim 1, wherein the first lens close to the magnifying side has positive diopter.

8. A high brightness zoom projection lens, which satisfying 2.2>Ft/Fw>1.2, Ft is the focal length at the telephoto end, Fw is the focal length at the wide-angle end, and from the magnifying side to the narrowing side of the lens sequentially comprising:
- a first lens group, having negative diopter, being a fixed group when zooming;
- a second lens group, having positive diopter, being a movable group when zooming;
- a third lens group, having positive diopter, being a movable group when zooming, and the amount of movement is the largest;
- a fourth lens group, having negative diopter, being a movable group when zooming;
- a fifth lens group, having positive diopter, being a movable group when zooming; and
- a sixth lens group, having positive diopter, being a fixed group when zooming;
- wherein the Abbe number of the last lens close to the narrowing side is between 16 and 25.

9. The high brightness zoom projection lens as claimed in claim 8, wherein an aperture is set between the third lens group and the fourth lens group, and the F value of the wide-angle end aperture is between 1.7 and 2.4.

10. The high brightness zoom projection lens as claimed in claim 8, wherein the high brightness zoom projection lens satisfies 10.5>TTL/Fw>7.8, where TTL is the distance from the top point of the first lens on the magnifying side to the image source on the narrowing side, and Fw is the focal length of the wide-angle end.

11. The high brightness zoom projection lens as claimed in claim 8, wherein all lenses of the high brightness zoom projection lens are glass lenses or spherical lenses.

12. The high brightness zoom projection lens as claimed in claim 8, wherein the third lens group or the fourth lens group include a doublet or an achromatic doublet.

13. The high brightness zoom projection lens as claimed in claim 8, wherein the first lens group having a focal length value of F1 satisfying −1.1>F1/Fw>−2.5, the second lens group having a focal length value of F2 satisfying 5.6>F2/Fw>2.8, the third lens group having a focal length value of F3 satisfying 4.2>F3/Fw>2.5, the fourth lens group having a focal length value of F4 satisfying −1.6>F4/Fw>−3.1, the fifth lens group having a focal length value of F5 satisfying 3.6>F5/Fw>2.5, the sixth lens group having a focal length value of F6 satisfying 3.6>F6/Fw>2.2.

14. The high brightness zoom projection lens as claimed in claim 8, wherein the first lens close to the magnifying side has positive diopter.

* * * * *